United States Patent
Sanji et al.

(10) Patent No.: US 11,388,556 B2
(45) Date of Patent: Jul. 12, 2022

(54) POSITION DETERMINATION SYSTEM

(71) Applicant: DENSO CORPORATION, Kariya (JP)

(72) Inventors: Kenichiro Sanji, Nisshin (JP); Taichi Yamaguchi, Kariya (JP); Kazunari Nakamura, Kariya (JP); Takashi Shinoda, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 17/168,522

(22) Filed: Feb. 5, 2021

(65) Prior Publication Data

US 2021/0168563 A1 Jun. 3, 2021

Related U.S. Application Data

(63) Continuation of application No. PCT/JP2019/025580, filed on Jun. 27, 2019.

(30) Foreign Application Priority Data

Aug. 10, 2018 (JP) .............................. JP2018-151312

(51) Int. Cl.
*H04W 4/40* (2018.01)
*H04W 4/029* (2018.01)
*G06V 20/59* (2022.01)

(52) U.S. Cl.
CPC ............ *H04W 4/029* (2018.02); *G06V 20/59* (2022.01); *H04W 4/40* (2018.02)

(58) Field of Classification Search
CPC ......... H04W 4/029; H04W 4/40; H04W 4/48; G06V 20/59; G06V 20/593; E05B 49/00; G01S 5/02; G01S 5/14; H04M 11/00
See application file for complete search history.

(56) References Cited

U.S. PATENT DOCUMENTS 8,145,199 B2 * 3/2012 Tadayon .............. H04B 5/0062
  455/418
8,315,617 B2 * 11/2012 Tadayon ................. H04L 43/16
  455/418

(Continued)

FOREIGN PATENT DOCUMENTS

JP     4511325 B2   7/2010
JP     4723415 B2   7/2011

(Continued)

*Primary Examiner* — Marcus Hammonds
(74) *Attorney, Agent, or Firm* — Harness, Dickey & Pierce, P.L.C.

(57) ABSTRACT

A position determination system determines a position of a mobile terminal relative to a vehicle by a wireless communication. The position determination system includes: a communication device disposed in a vehicle compartment and configured to receive a wireless signal transmitted from the mobile terminal and detect a reception strength of the received wireless signal. The position determination system is configured to: determine whether the mobile terminal is existing in the vehicle compartment; estimate an amount of absorbers that exists in the vehicle compartment and may absorb radio waves having a frequency used for the wireless communication; adjust an inside determination value which is used as a threshold for determining that the mobile terminal is existing in the vehicle compartment; and determine that the mobile terminal is existing in the vehicle compartment in response to the inside device strength being equal to or greater than the inside determination value.

23 Claims, 18 Drawing Sheets

(56) References Cited

U.S. PATENT DOCUMENTS

| | | | |
|---|---|---|---|
| 10,977,884 B2* | 4/2021 | Golsch | H01Q 1/1257 |
| 11,027,701 B2* | 6/2021 | Sanji | H04Q 9/00 |
| 2016/0150356 A1 | 5/2016 | Matsushita et al. | |
| 2018/0213355 A1* | 7/2018 | Smith | H01Q 25/005 |
| 2018/0316445 A1 | 11/2018 | Hamada et al. | |
| 2019/0375372 A1 | 12/2019 | Sanji et al. | |
| 2020/0233072 A1* | 7/2020 | Osai | H01Q 1/3283 |

FOREIGN PATENT DOCUMENTS

| | | |
|---|---|---|
| JP | 5449231 B2 | 3/2014 |
| JP | 5464488 B2 | 4/2014 |
| JP | 2015021245 A | 2/2015 |
| JP | 2015023346 A | 2/2015 |
| JP | 2015026988 A | 2/2015 |
| JP | 2015030381 A | 2/2015 |
| JP | 2015052223 A | 3/2015 |
| JP | 2015059396 A | 3/2015 |
| JP | 2015059397 A | 3/2015 |
| JP | 2015145578 A | 8/2015 |
| JP | 2015214316 A | 12/2015 |
| JP | 2016053507 A | 4/2016 |
| JP | 2016094801 A | 5/2016 |
| JP | 2017079430 A | 4/2017 |
| JP | 2018141771 A | 9/2018 |
| JP | 2019158765 A | 9/2019 |

* cited by examiner

|  | COMMUNICATION DEVICE SET AS RECEIVER | | |
| --- | --- | --- | --- |
|  | TRUNK COMMUNICATION DEVICE | 1ST REAR COMMUNICATION DEVICE | 2ND REAR COMMUNICATION DEVICE |
| FRONT COMMUNICATION DEVICE (COMMUNICATION DEVICE SET AS TRANSMITTER) | Pm(AB) | Pm(AC) | Pm(AD) |

FIG. 19

| | | COMMUNICATION DEVICE SET AS RECEIVER | | | |
|---|---|---|---|---|---|
| | | FRONT COMMUNICATION DEVICE | TRUNK COMMUNICATION DEVICE | 1ST REAR COMMUNICATION DEVICE | 2ND REAR COMMUNICATION DEVICE |
| COMMUNICATION DEVICE SET AS TRANSMITTER | FRONT COMMUNICATION DEVICE | – | Pm(AB) | Pm(AC) | Pm(AD) |
| | TRUNK COMMUNICATION DEVICE | Pm(BA) | – | Pm(BC) | Pm(BD) |
| | 1ST REAR COMMUNICATION DEVICE | Pm(CA) | Pm(CB) | – | Pm(CD) |
| | 2ND REAR COMMUNICATION DEVICE | Pm(DA) | Pm(DB) | Pm(DC) | – |

POSITION DETERMINATION SYSTEM

CROSS REFERENCE TO RELATED APPLICATIONS

The present application is a continuation application of International Patent Application No. PCT/JP2019/025580 filed on Jun. 27, 2019, which designated the U.S. and claims the benefit of priority from Japanese Patent Application No. 2018-151312 filed on Aug. 10, 2018. The entire disclosures of all of the above applications are incorporated herein by reference.

TECHNICAL FIELD

The present disclosure relates to a position determination system that estimates a position of a mobile terminal relative to a vehicle by a wireless communication between the mobile terminal carried by a user of the vehicle and the position determination system.

BACKGROUND ART

There has been known a system which estimates a position of a mobile terminal relative to a vehicle by performing a wireless communication between an on-board communication device and the mobile terminal.

SUMMARY

A position determination system, which is applied to a vehicle and determines a position of a mobile terminal carried by a user of the vehicle relative to the vehicle by performing a wireless communication with the mobile terminal, includes: at least one vehicle inside communication device positioned in a vehicle compartment of the vehicle and configured to: receive a wireless signal transmitted from the mobile terminal; and detect a reception strength of the wireless signal that is received as an inside device strength; a position determination unit configured to determine whether the mobile terminal is existing in the vehicle compartment based on the inside device strength; an absorber amount estimation unit configured to estimate an amount of radio wave absorbers, which exist in the vehicle compartment and absorb radio waves each having a frequency band used in the wireless communication, the amount of radio wave absorbers being estimated based on at least one of a reception state of the wireless signal in the at least one vehicle communication device or a detection result of a sensor equipped to the vehicle; and a threshold adjusting unit configured to adjust, based on an estimation result of the absorber amount estimation unit, an inside determination value which is a threshold referred by the position determination unit to determine that the mobile terminal is existing in the vehicle compartment. The position determination unit determines that the mobile terminal is existing in the vehicle compartment in response to the inside device strength being equal to or greater than the inside determination value adjusted by the threshold adjusting unit.

BRIEF DESCRIPTION OF DRAWINGS

The above and other objects, features and advantages of the present disclosure will become more apparent from the following detailed description made with reference to the accompanying drawings. In the drawings:

FIG. 19 is a diagram showing strength model data of the communication devices included in an authentication ECU according to a first modification of the present disclosure;

DETAILED DESCRIPTION

Figure 1:
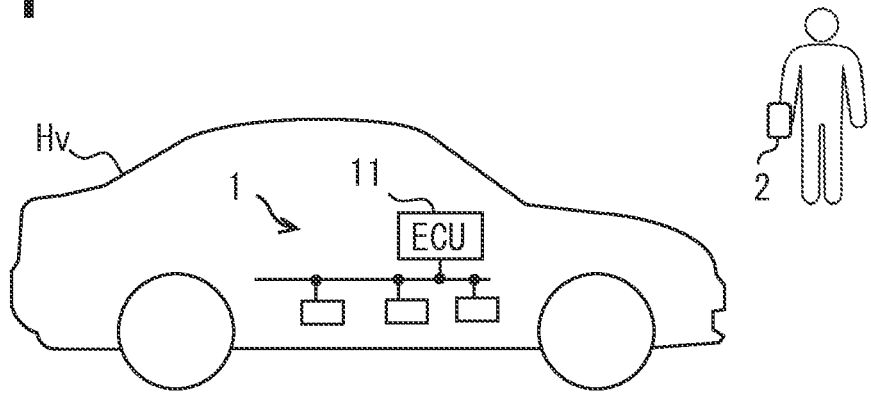
FIG. 1 is a diagram showing a schematic configuration of a vehicle electronic key system.

There has been known a system (hereinafter, referred to as a position estimation system) which estimates a position of a mobile terminal relative to a vehicle by performing a wireless communication between an on-board communication device mounted on the vehicle and the mobile terminal carried by a user of the vehicle. More specifically, the on-board communication device, which has been know, successively transmits a request signal from one communication device provided in the vicinity of a driver's seat in a compartment of the vehicle. In response to the mobile terminal receiving the request signal that requests a transmission of a response signal to the on-board communication device, the mobile terminal transmits the response signal which includes the RSSI (Received Signal Strength Indication) of the request signal. When the on-board communication device receives the response signal transmitted from the mobile terminal, the on-board communication device stores the RSSI included in the response signal in a memory. The on-board communication device determines that the mobile terminal is positioned in the vehicle compartment in response to an average value of the RSSIs for the last five times stored in the memory exceeding a predetermined threshold (hereinafter referred to as an inside determination value). In response to the average value of the RSSIs for the last five times being equal to or less than the inside determination value, the on-board communication device determines that the mobile terminal is positioned outside of the vehicle compartment.

The mobile terminal described above is a communication terminal having a communication function using Bluetooth (registered trademark). A smartphone, a cellular phone, or the like is assumed as the mobile terminal. Along with the above assumption, the on-board communication device performs a wireless communication based on Bluetooth (registered trademark). For the sake of convenience, hereinafter, a communication based on a predetermined wireless communication standard in which a communication area is, for example, at most, about several tens of meters, such as the Bluetooth, will be referred to as a short range communication.

As a modified example (hereinafter, referred to as an estimated configuration), the on-board system detects, with use of a communication device disposed in the vehicle compartment (hereinafter, referred to as a vehicle inside communication device) detects a reception strength of a signal transmitted from a mobile terminal. When the reception strength is equal to or greater than a predetermined inside determination value, the mobile terminal may be determined to be existing in the vehicle compartment. In the estimated configuration, the inside determination value needs to be properly set to a value so that the mobile terminal is correctly determined to be existing in the vehicle compartment or outside the vehicle compartment with a higher accuracy. For example, the inside determination value may be set based on measuring results of a test in which the reception strength of the vehicle inside communication device is measured with the mobile terminal disposed in the vehicle compartment and a test in which the reception strength of the vehicle inside communication device is measured with the mobile terminal disposed outside of the vehicle compartment.

The radio wave having a frequency of 1 GHz or higher (specifically, radio waves within the 2.4 GHz band) used in the short range communication has a larger human body loss than radio waves having LF (Low Frequency) band. That is, the radio wave within the 2.4 GHz band is easily absorbed by the human body. Thus, the reception strength of the signal transmitted from the mobile terminal in the vehicle inside communication device is affected by existence of occupants in the vehicle compartment and the number of occupants. Specifically, the reception strength when five adults are on board in the vehicle having a riding capacity of about five (that is, when the vehicle is in full state) will substantially decrease compared with the reception strength when no occupant is on board by a certain level (for example, about 5 dB).

The estimated configuration sets the inside determination value based on the reception strength observed when no occupant is on board. In this configuration, when one or more occupant is on board, the reception strength of the signal transmitted from the mobile terminal carried by the occupant is less likely to exceed the inside determination value. This is because, the inside determination value determined based on the reception strength of the signal, which is observed under a state where no occupant is on board, has a relatively high value. As a result, although the mobile terminal is existing outside of the vehicle compartment, it may be erroneously determined that the mobile terminal is existing in the vehicle compartment.

Suppose that the inside determination value is set based on the reception strength observed when the vehicle is in full state. In this configuration, the reception strength of the signal transmitted from the mobile terminal carried by the occupant is highly likely to exceed the inside determination value. This is because the inside determination value determined based on the reception strength observed in the full state of the vehicle has a relatively low value. As a result, although the mobile terminal is existing outside of the vehicle compartment, it may be erroneously determined that the mobile terminal is existing in the vehicle compartment.

According to an aspect of the present disclosure, a position determination system, which is applied to a vehicle and determines a position of a mobile terminal carried by a user of the vehicle relative to the vehicle by performing a wireless communication with the mobile terminal, includes: at least one vehicle inside communication device positioned in a vehicle compartment of the vehicle and configured to: receive a wireless signal transmitted from the mobile terminal; and detect a reception strength of the wireless signal that is received as an inside device strength; a position determination unit configured to determine whether the mobile terminal is existing in the vehicle compartment based on the inside device strength; an absorber amount estimation unit configured to estimate an amount of radio wave absorbers, which exist in the vehicle compartment and absorb radio waves each having a frequency band used in the wireless communication, the amount of radio wave absorbers being estimated based on at least one of a reception state of the wireless signal in the at least one vehicle communication device or a detection result of a sensor equipped to the vehicle; and a threshold adjusting unit configured to adjust, based on an estimation result of the absorber amount estimation unit, an inside determination value which is a threshold referred by the position determination unit to determine that the mobile terminal is existing in the vehicle compartment. The position determination unit determines that the mobile terminal is existing in the vehicle compartment in response to the inside device strength being equal to or greater than the inside determination value adjusted by the threshold adjusting unit. The at least one vehicle inside communication device includes a plurality of vehicle inside communication devices. One of the plurality of vehicle inside communication devices is configured to operate as a transmitter which transmits the wireless signal including transmission source information. At least one of the remaining of the plurality of vehicle inside communication devices is configured to operate as a receiver, and the receiver is configured to: receive, as an inside device transmission signal, the wireless signal transmitted from the transmitter; detect a reception strength of the inside device transmission signal; and report the detected reception strength of the inside device transmission signal to the absorber amount estimation unit. The absorber amount estimation unit acquires, as an index indicating the amount of radio wave absorbers existing in the vehicle compartment, the reception strength of the inside device transmission signal which is detected by the receiver. The threshold adjusting unit sets the inside determination value in a manner that the inside determination value decreases with a decrease of the reception strength of the inside device transmission signal acquired by the absorber amount estimation unit. The position determination system further includes a strength model storage configured to store, as an estimated strength value, an estimated value of the reception strength of the inside device transmission signal, which is transmitted from the transmitter and received by the receiver, under a condition that an environment inside the vehicle compartment becomes a predetermined model environment. The absorber amount estimation unit calculates, as the index indicating the amount of radio wave absorbers existing in the vehicle compartment, a model differential value by subtracting the reception strength of the inside device transmission signal which is detected by the receiver from the estimated strength value stored in the strength model storage. The threshold adjusting unit sets the inside determination value in a manner that the inside determination value decreases with an increase of the model differential value calculated by the absorber amount estimation unit. The transmitter is configured to transmit the wireless signal as the inside device transmission signal using a plurality of frequencies. The receiver is configured to detect the reception strength of the inside device transmission signal for each of the plurality of frequencies. The absorber amount estimation unit is configured to: calculate, for each receiver, the individual strength representative value corresponding to each receiver, which represents the reception strength of the inside device transmission signal in each receiver, based on the reception strength corresponding to each of the plurality of frequencies detected by the corresponding receiver; and calculate, as the model differential value, a difference between the individual strength representative value corresponding to each receiver and the estimated strength value for each receiver.

The radio wave absorber is an object having a property of absorbing radio waves of the mobile terminal, and a human body or the like also corresponds to the radio wave absorber. For example, the absorber amount estimation unit estimates that the amount of radio wave absorbers existing in the vehicle compartment is large when the number of occupants in the vehicle compartment is large. The threshold adjusting unit sets the inside determination value corresponding to the estimation result of the absorber amount estimation unit. With this configuration, the inside determination value can be adjusted to a value corresponding to the number of occupants in the vehicle compartment. Thus, whether the mobile terminal is existing in the vehicle compartment or outside the vehicle compartment can be determined with a higher accuracy.

According to another aspect of the present disclosure, a position determination system, which is applied to a vehicle and determines a position of a mobile terminal carried by a user of the vehicle relative to the vehicle by performing a wireless communication with the mobile terminal, includes: at least one vehicle inside communication device positioned in a vehicle compartment of the vehicle and configured to: receive a wireless signal transmitted from the mobile terminal; and detect a reception strength of the wireless signal that is received as an inside device strength; a position determination unit configured to determine whether the mobile terminal is existing in the vehicle compartment based on the inside device strength; an absorber amount estimation unit configured to estimate an amount of radio wave absorbers, which exist in the vehicle compartment and absorb radio waves each having a frequency band used in the wireless communication, the amount of radio wave absorbers being estimated based on at least one of a reception state of the wireless signal in the at least one vehicle communication device or a detection result of a sensor equipped to the vehicle; and a threshold adjusting unit configured to adjust, based on an estimation result of the absorber amount estimation unit, an inside determination value which is a threshold referred by the position determination unit to determine that the mobile terminal is existing in the vehicle compartment. The position determination unit determines that the mobile terminal is existing in the vehicle compartment in response to the inside device strength being equal to or greater than the inside determination value adjusted by the threshold adjusting unit. The at least one vehicle inside communication device includes a plurality of vehicle inside communication devices. One of the plurality of vehicle inside communication devices is configured to operate as a transmitter which transmits the wireless signal including transmission source information. At least one of the remaining of the plurality of vehicle inside communication devices is configured to operate as a receiver, and the receiver is configured to: receive, as an inside device transmission signal, the wireless signal transmitted from the transmitter; detect a reception strength of the inside device transmission signal; and report the detected reception strength of the inside device transmission signal to the absorber amount estimation unit. The absorber amount estimation unit acquires, as an index indicating the amount of radio wave absorbers existing in the vehicle compartment, the reception strength of the inside device transmission signal which is detected by the receiver. The threshold adjusting unit sets the inside determination value in a manner that the inside determination value decreases with a decrease of the reception strength of the inside device transmission signal acquired by the absorber amount estimation unit. The plurality of vehicle inside communication devices are disposed in the vehicle compartment in a manner that each vehicle inside communication device is out of a viewable range of each of the remaining of the plurality of vehicle inside communication devices.

According to further another aspect of the present disclosure, a position determination system, which is applied to a vehicle and determines a position of a mobile terminal carried by a user of the vehicle relative to the vehicle by performing a wireless communication with the mobile terminal, includes: at least one vehicle inside communication device positioned in a vehicle compartment of the vehicle and configured to: receive a wireless signal transmitted from the mobile terminal; and detect a reception strength of the wireless signal that is received as an inside device strength; a position determination unit configured to determine whether the mobile terminal is existing in the vehicle compartment based on the inside device strength; an absorber amount estimation unit configured to estimate an amount of radio wave absorbers, which exist in the vehicle compartment and absorb radio waves each having a frequency band used in the wireless communication, the amount of radio wave absorbers being estimated based on at least one of a reception state of the wireless signal in the at least one vehicle communication device or a detection result of a sensor equipped to the vehicle; and a threshold adjusting unit configured to adjust, based on an estimation result of the absorber amount estimation unit, an inside determination value which is a threshold referred by the position determination unit to determine that the mobile terminal is existing in the vehicle compartment. The position determination unit determines that the mobile terminal is existing in the vehicle compartment in response to the inside device strength being equal to or greater than the inside determination value adjusted by the threshold adjusting unit. The absorber amount estimation unit adopts, as the sensor, at least one of a seat sensor configured to detect a seating state of an occupant on a seat, a seatbelt sensor configured to detect a wearing state of a seatbelt, or an on-board camera disposed in the vehicle compartment to capture an image of an entire inside area of the vehicle compartment. The absorber amount estimation unit specifies, based on the detection result of the sensor, the amount of occupants existing in the vehicle compartment as the index indicating the amount of radio wave absorbers existing in the vehicle compartment. The threshold adjusting unit sets the inside determination value in a manner that the inside determination value decreases with an increase of the amount of the occupants specified by the absorber amount estimation unit, the at least one vehicle inside communication device includes a plurality of vehicle inside communication devices. Each of the plurality of vehicle inside communication devices is disposed in the vehicle compartment at a position different from one another. The absorber amount estimation unit specifies a seating position of each occupant in the vehicle compartment based on at least one of a detection result of the seat sensor, a detection result of the seatbelt sensor, or an image captured by the on-board camera disposed in the vehicle compartment. The position determination unit is configured to: calculate, for the inside device strength acquired in each of the plurality of vehicle inside communication devices, an inside device strength representative value, which is a representative value of the reception strength of the wireless signal transmitted from the mobile terminal in the vehicle compartment, with use of a value to which a correction amount corresponding to the seating position specified by the absorber amount estimation unit and a position of each of the plurality of vehicle inside communication devices in the vehicle compartment is assigned; and determine the position of the mobile terminal with use of the inside device strength representative value instead of the inside device strength.

Embodiment

The following will describe an exemplary embodiment of the position determination system according to the present disclosure with reference to the drawings. FIG. 1 is a diagram showing an example of a schematic configuration of a vehicle electronic key system to which the position determination system according to the present disclosure is applied. As shown in FIG. 1, the vehicle electronic key system includes an on-board system 1 equipped to a vehicle Hv and a mobile terminal 2 which is a communication terminal carried by a user of the vehicle Hv.

Each of the on-board system 1 and the mobile terminal 2 is configured to be capable of performing a communication (hereinafter, referred to as short range communication) with one another based on a predetermined short range wireless communication standard which has a communication range of, for example, about several tens of meters at most. As the short range wireless communication standard, for example, Bluetooth Low Energy (Bluetooth is a registered trademark), Wi-Fi (registered trademark), ZigBee (registered trademark), or the like can be adopted. As an example, the on-board system 1 and the mobile terminal 2 in the present embodiment are configured to perform the wireless communication based on the Bluetooth Low Energy standard.

The mobile terminal 2 is correlated with the on-board system 1, and functions as an electronic key of the vehicle Hv. The mobile terminal 2 is a communication device that can be carried by a user and has the short range communication function described above. For example, a smartphone can be used as the mobile terminal 2. As another example, the mobile terminal 2 may be a tablet terminal, a wearable device, a portable music player, a portable game device, or the like. The signal transmitted from the mobile terminal 2 based on the short range communication includes transmission source information. The transmission source information is, for example, predetermined identification information (hereinafter, referred to as a terminal ID) preliminarily assigned to the mobile terminal 2. The terminal ID functions as identification information of the mobile terminal 2 from another communication terminal.

The mobile terminal 2 wirelessly transmits a communication packet including transmission source information at a predetermined transmission interval, thereby notifying, to a surrounding communication terminal having the short range communication function, of a presence of the mobile terminal 2 itself (that is, advertising). In the following description, for convenience, the communication packet periodically transmitted for advertising is referred to as advertisement packet.

A transmission interval of the advertisement packet may be variable according to an operation state of the mobile terminal 2. For example, in a case where a predetermined application using the short range communication function is operating in a foreground of the mobile terminal 2, the transmission interval may be set to a relatively short interval (for example, 50 milliseconds). On the other hand, in a case where the predetermined application is not operating in the foreground, the transmission interval may be set to a relatively long interval (200 milliseconds). The mobile terminal 2 may be configured to transmit the advertisement packet at least once in a predetermined period (for example, 200 milliseconds) defined by the vehicle electronic key system.

The on-board system 1 receives a signal (for example, the advertisement packet) transmitted from the mobile terminal 2 based on the short range communication function described above, thereby detecting that the mobile terminal is existing within a range in which the on-board system 1 can perform the short range communication. In the following description, a range in which the on-board system 1 can mutually communicate data with the mobile terminal 2 based on the short range communication function is also referred to as a communication area.

In an example of the present embodiment, the on-board system 1 is configured to detect the presence of the mobile terminal 2 within the communication area by receiving the advertisement packet successively transmitted from the mobile terminal 2. Detection of the mobile terminal 2 in the present disclosure is not limited to this configuration. As another example, the on-board system 1 may be configured to successively transmit the advertisement packet and detect the presence of the mobile terminal 2 in the communication area based on an establishment of a communication connection (so-called connection) with the mobile terminal 2.

(Vehicle Configuration)

The following will describe a configuration of the vehicle Hv. For example, the vehicle Hv is a passenger car having a riding capacity of five. As an example, the vehicle Hv includes front seats and rear seats, and a driver's seat (in other words, a steering wheel) is disposed on the right side.

At a rear end of a compartment of the vehicle Hv, a space functioning as luggage room (in other words, trunk room) is disposed. In other words, a space in which the rear seat of the vehicle Hv is disposed is connected with the trunk room through an upper portion of a backrest 42 of the rear seat.

The vehicle Hv may have a different structure other than the example described above. For example, the vehicle Hv may have the driver's seat on the left side. The vehicle Hv may be a vehicle without a rear seat. In addition, the vehicle Hv may be provided with a trunk room independent of a passenger compartment of the vehicle. The vehicle may include multiple rows of rear seats. The vehicle Hv may be a cargo transporter, such as a truck. The vehicle Hv may be a camping vehicle.

In addition, the vehicle Hv may be a vehicle provided for a vehicle rental service (so-called rental vehicle) or a vehicle provided for a car-sharing service (so-called shared vehicle). The shared vehicle also includes a vehicle used for a service which lends a personally owned vehicle to another person during a time period when an administrator of the vehicle is not using the vehicle. In a case where the vehicle Hv is a vehicle provided under the above described service (hereinafter, referred to as a service vehicle), a person who is contracting to use the service becomes the user. In other words, a person who has a right to use the vehicle Hv is the user of the vehicle Hv.

Various kinds of body panels of the vehicle Hv are made of metal members. Herein, the body panel is a component group that provides an appearance shape of the vehicle Hv. The body panels include side body panels, a roof panel, a rear end panel, an engine hood panel, door panels, pillars, and the like which are assembled to a vehicle body shell. In the following description, a configuration including a combination of the various kinds of body panels is referred to as a body.

Since a metal plate has a property of reflecting radio waves, the body panels of the vehicle Hv reflect radio waves. In other words, the vehicle Hv includes the body that blocks a linear propagation of the radio wave. In this example, the radio wave has a frequency band (herein, 2.4 GHz band) which is used for the wireless communication between the on-board system 1 and the mobile terminal 2. The body shell itself may be made of a metal member such as a steel plate, or may be made of a carbon-based resin. The body shell may also be made of metal.

The blocking of radio wave in the present disclosure ideally refers to the reflection of radio wave, but the blocking is not limited to the reflection. A configuration capable of attenuating the radio wave to a predetermined level (hereinafter, referred to as a target attenuation level) or lower corresponds to a configuration that blocks the propagation of radio wave. The target attenuation level may be a value at which a significant difference occurs between the signal strength of the radio wave inside the vehicle compartment and the signal strength of the radio wave outside the vehicle compartment. For example, the target attenuation level is set to 10 dB. Alternatively, the target attenuation level may be set equal to or higher than 5 dB (for example, 10 dB or 20 dB).

The vehicle Hv includes a roof portion provided by the roof panel and multiple pillars that support the roof panel. The multiple pillars are also referred to as A pillars, B pillars, and C pillars in a stated order from a front end to a rear end of the vehicle. The vehicle Hv includes, as multiple pillars, A pillars, B pillars, and C pillars. The A pillars are disposed in front of the front seat. The B pillars are disposed between the front seat and the rear seat. The C pillars are pillars disposed obliquely behind the rear seat.

As another example, the vehicle Hv may include D pillars that are fourth pillars from the front end, and E pillars that are fifth pillars from the front end. Partial or entire part of each pillar may be made of a metal member such as a high tensile strength steel plate. As another example, the pillar may be made of carbon fiber or resin. In addition, the pillar may be made of the combination of various materials. Hereinafter, the right side and the left side refer to the right side and the left side relative to a front to rear direction of the vehicle. For example, the right B pillar refers to the B pillar located on the right side of the vehicle.

In the present disclosure, for convenience, a part of the vehicle compartment, which is located at a front portion of a backrest 41 of the front seat is referred to as a front area. The front area includes an area of the vehicle compartment located above an instrument panel 44. A part of the vehicle compartment, which is located at a rear portion of the backrest 41 of the front seat and a front portion of the backrest 42 of the rear seat is referred to as a rear area. Further, a part of the vehicle compartment, which is located at the rear portion of the backrest 42 of the rear seat is referred to as a trunk area. The trunk area is an area corresponding to the luggage room.

(Configuration of On-Board System)

Figure 2:
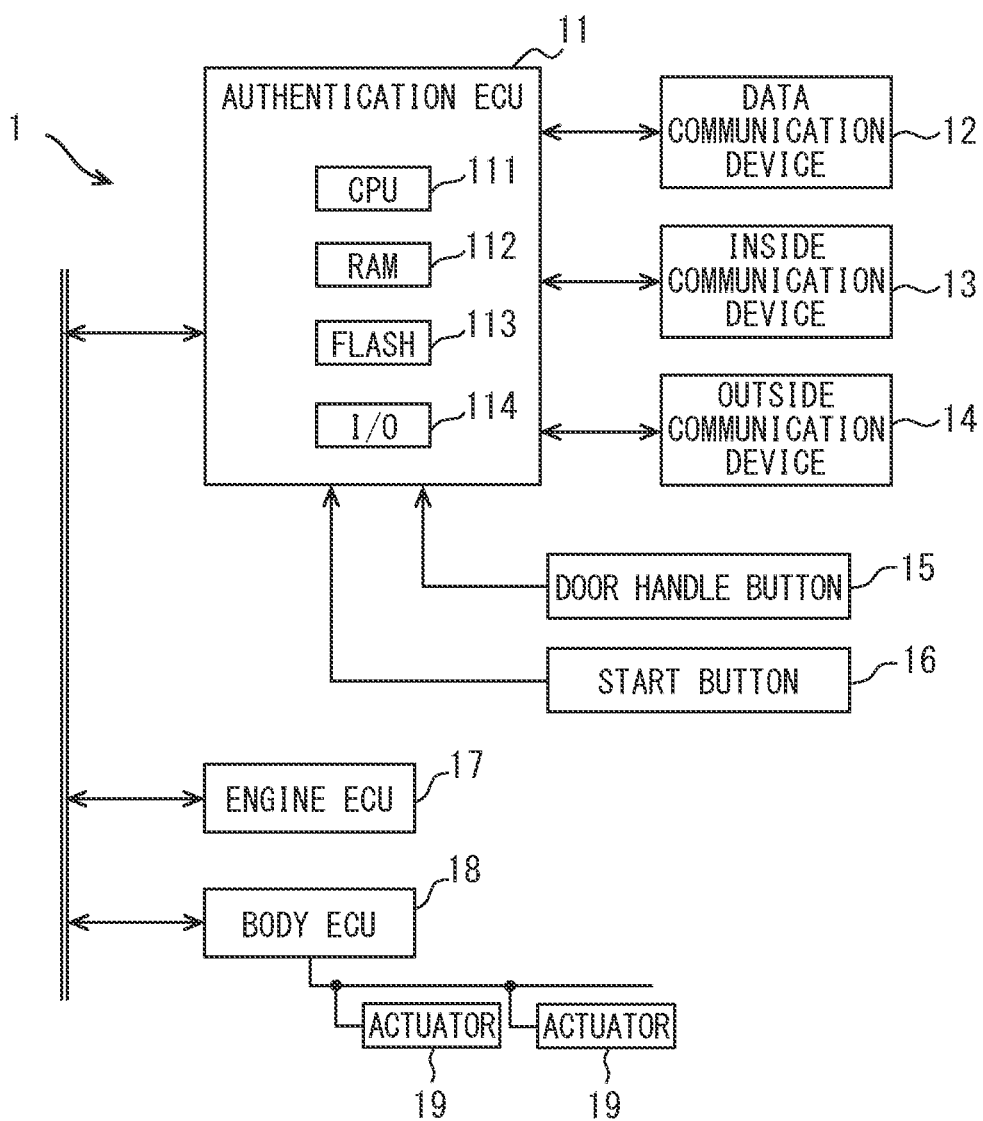
FIG. 2 is a block diagram showing a schematic configuration of an on-board system.

The following will describe a configuration and an operation of the on-board system 1. As shown in FIG. 2, the on-board system 1 includes an authentication ECU 11, a data communication device 12, a vehicle inside communication device 13, a vehicle outside communication device 14, a door handle button 15, a start button 16, an engine ECU 17, and a body ECU 18. The ECU used in the names is an abbreviation of Electronic Control Unit, and indicates an electronic control device.

The authentication ECU 11 is an ECU that determines the position of the mobile terminal 2 by operating together (that is, cooperation) with the data communication device 12 or the like, and performs a vehicle control according to the determination result by cooperating with other ECUs. The authentication ECU 11 is implemented by a computer. The authentication ECU 11 includes a CPU (Central Processing Unit) 111, a RAM 112, a flash memory 113, an I/O 114, a bus line for connecting these components, and the like. The authentication ECU 11 may be implemented by using an MPU (Micro Processing Unit) or a GPU (Graphics Processing Unit) instead of the CPU 111. The authentication ECU 11 may be implemented by a combination of the CPU 111, the MPU, and the GPU.

The CPU 111 is an arithmetic processing unit that executes various calculation processing. The RAM 112 is a volatile storage medium, and the flash memory 113 is a rewritable non-volatile storage medium. The I/O 114 is a circuit module that functions as an interface of the authentication ECU 11 to communicate with other devices mounted on the vehicle Hv, such as the data communication device 12. The I/O 114 may be implemented by use of an analogue circuit element, an IC, or the like.

A terminal ID assigned to the mobile terminal 2 owned by the user is registered in the flash memory 113. The flash memory 113 further stores a program (hereinafter, referred to as a position determination program) for controlling a general purpose computer to function as the authentication ECU 11. It should be noted that the position determination program described above may be stored in a non-transitory tangible storage medium. The execution of the position determination program by the CPU 111 corresponds to the execution of a method corresponding to the position determination program.

The flash memory 113 stores two parameters, that is, an inside corresponding value Pin and an outside corresponding value Pout, as thresholds (hereinafter, referred to as determination threshold) based on which the authentication ECU 11 determines whether the mobile terminal 2 is existing inside the vehicle compartment with reference to the reception strength of the signal transmitted from the mobile terminal 2. The inside corresponding value Pin is a threshold based on which the authentication ECU determines that the mobile terminal 2 is existing inside the vehicle compartment. The outside corresponding value Pout is a threshold based on which the authentication ECU determines that the mobile terminal 2 is existing outside the vehicle compartment. The inside corresponding value Pin corresponds to an inside determination value, and the outside corresponding value Pout corresponds to an outside determination value. The technical significance and setting method of the inside corresponding value Pin and the outside corresponding value Pout will be described later. The flash memory 113 stores the strength model data of the communication devices used in the absorber amount estimation process described later and mapping data indicating the relationship between the absorber amount and threshold. The authentication ECU 11 will be described in detail later.

Each of the data communication device 12, the vehicle inside communication device 13, and the vehicle outside communication device 14 is a communication module (hereinafter, referred to as on-board communication device) that is equipped to the vehicle and performs the short range communication. The data communication device 12 is configured to transmit and receive data to and from the mobile terminal 2 for the authentication ECU 11. The vehicle inside communication device 13 and the vehicle outside communication device 14 are configured to provide, to the authentication ECU 11, the reception strength of the signal transmitted from the mobile terminal 2.

The data communication device 12, the vehicle inside communication device 13, and the vehicle outside communication device 14 differ from one another only in the specific operation, and can be implemented by use of on-board communication devices 3 having the same configurations. In the following description, except when the data communication device 12, the vehicle inside communication device 13, and the vehicle outside communication device 14 need to be distinguished from one another, these communication devices are generally described as the on-board communication devices 3. Each on-board communication device 3 may be connected to the authentication ECU 11 through a dedicated communication line or an in-vehicle network so that each on-board communication device is mutually communicable with the authentication ECU 11. Each on-board communication device 3 is assigned with a predetermined communication device number. The communication device number is information corresponding to the terminal ID of the mobile terminal 2. The communication device number functions as identification information of each on-board communication device 3 from another on-board communication device 3.

Figure 3:
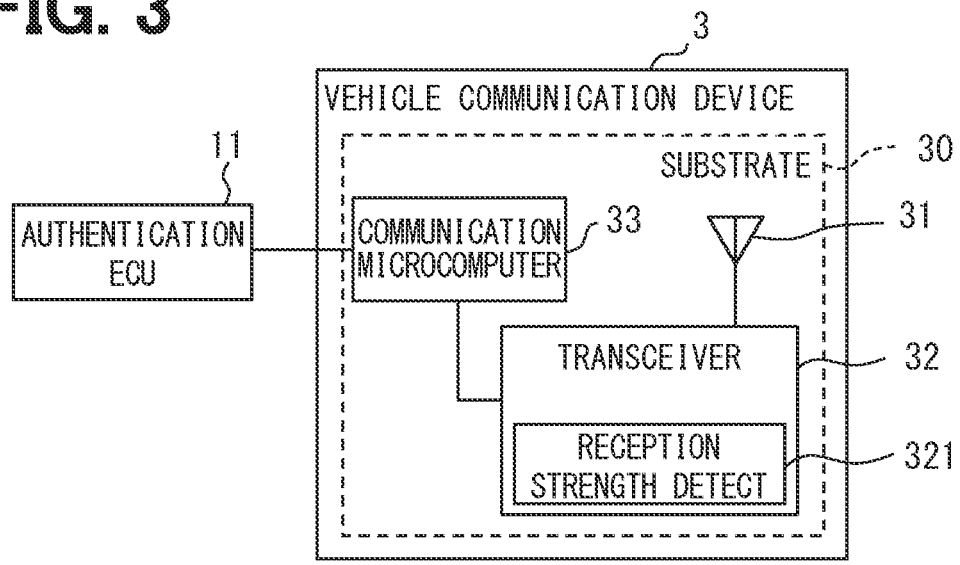
FIG. 3 is a block diagram showing a schematic configuration of an on-board communication device.

FIG. 3 is a diagram schematically showing an electrical configuration of the on-board communication device 3. As shown in FIG. 3, the on-board communication device 3 includes a substrate 30, an antenna 31, a transceiver 32, and a communication microcomputer 33. For example, the substrate 30 is provided by a printed circuit board. Electronic components configuring the on-board communication device 3, such as the antenna 31 are mounted on the substrate 30.

The antenna 31 is configured to transmit and receive radio waves having a frequency band (for example, 2.4 GHz band) of the short range communication. In the present embodiment, as an example, the antenna 31 is implemented as an omnidirectional antenna. As another example, the antenna 31 may be configured to have directivity. The antenna 31 may be disposed on the substrate 30 by patterning (that is, patterned antenna) so that a thickness of the on-board communication device 3 can be reduced. The antenna 31 is electrically connected to the transceiver 32.

The transceiver 32 demodulates a signal received by the antenna 31 and outputs the demodulated signal to the communication microcomputer 33. Further, the transceiver 32 modulates the signal transmitted from the authentication ECU 11 through the communication microcomputer 33, and outputs the modulated signal to the antenna 31. The antenna 31 transmits the modulated signal as radio waves. The transceiver 32 is connected to the communication microcomputer 33 in a mutually communicable manner.

The transceiver 32 includes a reception strength detection unit 321 that successively detects the strength of the signal received by the antenna 31. The reception strength detection unit 321 can be implemented by various circuit configurations. The reception strength detected by the reception strength detection unit 321 is successively provided to the communication microcomputer 33 in association with the terminal ID included in the reception data. The reception strength may be expressed by, for example, a unit (dBm) of power. For convenience, data in which the reception strength and the terminal ID are associated with each other is referred to as reception strength data.

The communication microcomputer 33 is configured to control the transmission and reception of data to and from the authentication ECU 11. The communication microcomputer 33 is implemented by an MPU, a RAM, a ROM, or the like. The communication microcomputer 33 outputs the reception data transmitted from the transceiver 32 to the authentication ECU 11 successively or based on a request from the authentication ECU 11. Thus, the data received by the transceiver 32 is provided to the authentication ECU 11 through the communication microcomputer 33.

The communication microcomputer 33 has a function of authenticating the terminal ID of the mobile terminal 2, and has a function of performing an encrypted communication with the mobile terminal 2 in response to a request from the authentication ECU 11. As an encryption method of the encrypted communication, various methods, such as an encryption method defined by Bluetooth can be used. As an authentication method of the mobile terminal, various methods, such as a method defined by Bluetooth can be used.

In response to the communication microcomputer 33 acquiring the reception strength data from the reception strength detection unit 321, the communication microcomputer 33 accumulates the reception strength data in a RAM which is not shown in the drawings. For example, the reception strength data successively acquired may be sorted in chronological order in the RAM so that the reception strength of the latest reception data becomes a head of the list. The data that has been stored before a certain period of time may be successively discarded. In other words, the reception strength data is stored in the RAM for a predetermined period of time. The communication microcomputer 33 provides the reception strength data stored in the RAM in response to a request from the authentication ECU 11. The reception strength data has been provided to the authentication ECU 11 may be deleted from the RAM.

In the present embodiment, the reception strength data output from the transceiver 32 is temporarily stored in the RAM, and the communication microcomputer 33 provides the reception strength data accumulated in the RAM to the authentication ECU 11 in response to a request from the authentication ECU 11. However, the present disclosure is not limited to this configuration. Alternatively, the reception strength data may be successively provided to the authentication ECU 11 without being temporarily stored in the RAM.

The data communication device 12 is provided by the on-board communication device 3 which has already executed a key exchange protocol (known as pairing) with the mobile terminal 2 in response to an operation made by the user or the like. Information about the mobile terminal 2 acquired by pairing (hereinafter, referred to as terminal information) is stored in a non-volatile memory included in the communication microcomputer 33. The terminal information includes, for example, a key exchanged by pairing, a terminal ID, or the like. Storage of the exchanged keys is also referred to as bonding. In a case where the vehicle Hv is used by multiple users, the terminal information of the mobile terminal 2 carried by each user is stored in the communication microcomputer.

In response to the data communication device 12 receiving the advertisement packet from the mobile terminal 2, the data communication device 12 automatically establishes a communication connection with the mobile terminal 2 with reference to the terminal information stored in the data communication device 12. Then, the authentication ECU 11 transmits and receives data to and from the mobile terminal 2. In response to the data communication device 12 establishing the communication connection with the mobile terminal 2, the data communication device 12 provides, to the authentication ECU 11, the terminal ID of the mobile terminal 2 with which the communication connection is established.

According to the Bluetooth standard, an encrypted data communication is performed by a frequency hopping method. The frequency hopping method is a communication method in which channels to be used for a communication are successively switched to another over time. Specifically, in the Bluetooth standard, the data communication is performed by a frequency hopping spread spectrum method (FHSS: Frequency Hopping Spread Spectrum).

In the Bluetooth Low Energy (hereinafter, referred to as Bluetooth LE), 40 channels from channel No. 0 to channel No. 39 are prepared, and 37 channels from channel No. 0 to channel No. 36 are available for the data communication. The three channels from channel No. 37 to channel No. 39 are used for transmission of the advertisement packet.

In a state where the communication connection between the data communication device 12 and the mobile terminal 2 is established, the data communication device 12 performs transmission and reception of data with the mobile terminal 2 by using 37 channels that are successively changed. The data communication device 12 successively provides information (hereinafter, referred to as channel information) indicating a channel used for the communication with the mobile terminal 2 to the authentication ECU 11. The channel information may be a specific channel number, or may be a parameter (known as hop Increment) indicating a transition rule of the in-use channel. The hop increment is a number from 5 to 16 that is randomly determined in the communication connection. The channel information may include a current channel number and a hop increment.

The data communication device 12 may be disposed at a position where an inside periphery and an outside periphery of the vehicle door can be included within a viewable range from the position of the data communication device. For example, a ceiling portion in the vehicle compartment may be the position where the inside periphery and the outside periphery of the vehicle door can be included within the viewable range from the position of the data communication device. In a case where the vehicle Hv includes the pillars made of resin, the portions corresponding to pillars also corresponds to the position where the inside periphery and the outside periphery of the vehicle door can be included within the viewable range from the position of the data communication device. As an example, the data communication device 12 according to the present embodiment is disposed in the vicinity of a center of the ceiling portion inside the vehicle compartment.

The viewable range from the position of the on-board communication device 3 refers to an area in which a signal transmitted from the on-board communication device 3 can directly reach. Since the propagation path of the radio signal is reversible, the viewable range of the on-board communication device 3 also refers to an area in which the on-board communication device 3 can directly receive the signal transmitted from the mobile terminal 2.

An area beyond the viewable range of the on-board communication device 3 is an area in which the signal transmitted from the on-board communication device 3 cannot directly reach. Since the propagation path of the radio signal is reversible, the area beyond the viewable range of the on-board communication device 3 also refers to an area in which the on-board communication device 3 cannot directly receive the signal transmitted from the mobile terminal 2. Even when the mobile terminal 2 is existing in the area beyond the viewable range of the on-board communication device 3, the signal transmitted from the mobile terminal 2 can reach the area beyond the viewable range by reflection on various structures. In other words, even when the mobile terminal 2 is existing in the area beyond the viewable range of the data communication device 12, the mobile terminal 2 and the data communication device 12 can perform the wireless communication with one another by the reflection of radio waves on a structure or the like.

In the present embodiment, the number of data communication device 12 equipped to the vehicle Hv is one as an example. However, the present disclosure is not limited to this example. Multiple on-board communication devices 3 may be equipped to the vehicle Hv as the data communication devices 12. As another example, a part of the vehicle inside communication device 13 and the vehicle outside communication device 14 may be used as the data communication device 12, and details of this example will be described later.

Figure 4:
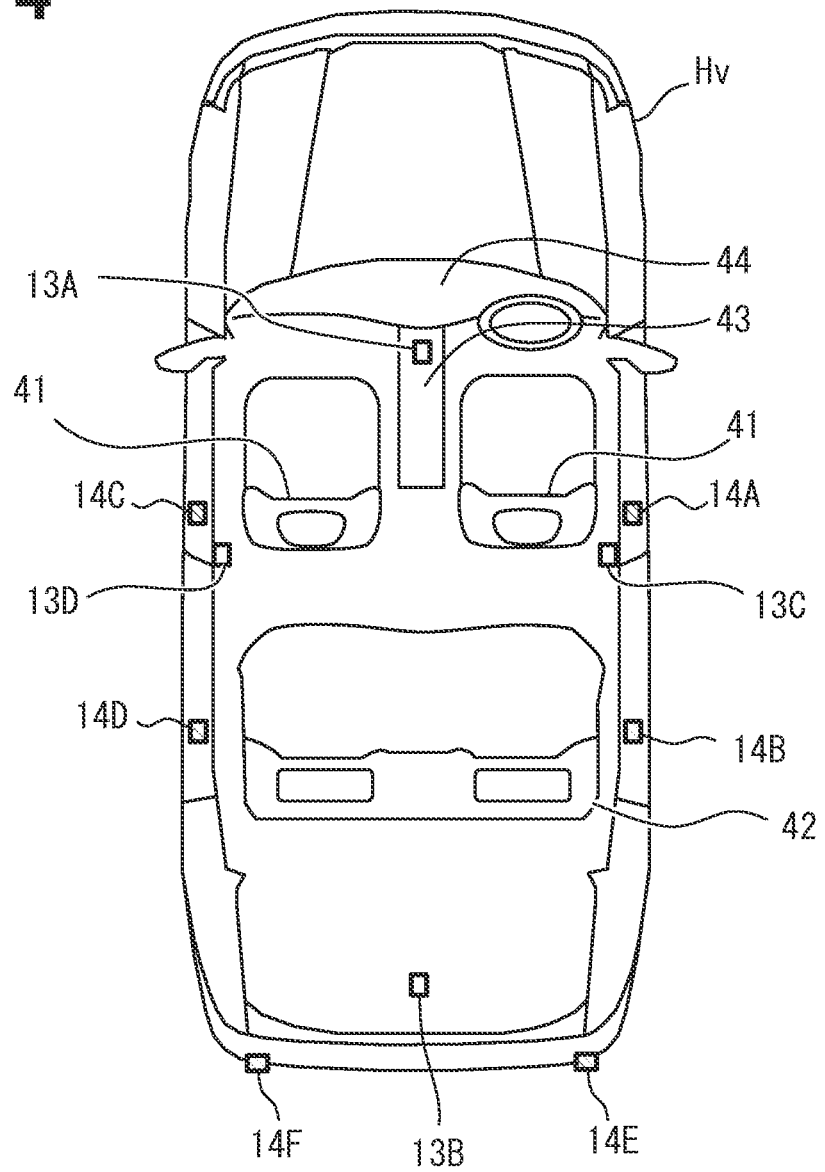
FIG. 4 is a diagram conceptually showing an example of a mounting position of the on-board communication device.

The vehicle inside communication device 13 is the on-board communication device 3 disposed inside the vehicle compartment. At least one vehicle inside communication device 13 is disposed inside the vehicle compartment. For convenience, FIG. 2 shows an example in which only one vehicle inside communication device 13 is illustrated. However, the on-board system 1 may include multiple vehicle inside communication devices 13. As shown in FIG. 4, the on-board system 1 according to the present embodiment includes, as the vehicle inside communication device 13, a front communication device 13A, a trunk communication device 13B, a first rear communication device 13C, and a second rear communication device 13D. In the present embodiment, the above-mentioned data communication device 12 is also arranged inside the vehicle compartment. Thus, the data communication device 12 may be configured to operate as one of the vehicle inside communication devices 13.

FIG. 4 is a conceptual top view of the vehicle Hv, and shows a roof portion in a transparent manner in order to describe the installation positions of the vehicle inside communication devices 13 and the vehicle outside communication devices 14. The installation position of each vehicle inside communication device 13 can be properly changed. Further, the number of vehicle inside communication devices 13 included in the on-board system 1 can be properly changed. The number of the vehicle inside communication devices 13 included in the on-board system 1 may be four or less. For example, the number of the vehicle inside communication devices 13 may be one, two, or three. Alternatively, the number of vehicle inside communication devices 13 may be five or more.

The front communication device 13A is the vehicle inside communication device 13 which sets the front area in the vehicle compartment as a strong electric field area. The strong electric field area is an area in which a signal transmitted from the on-board communication device 3 propagates while maintaining a strength equal to or higher than a predetermined threshold (hereinafter, referred to as a strong electric field threshold). The strong electric field threshold is set to a sufficiently strong level as a signal for the short range communication. For example, the strong electric field threshold may be set to −35 dBm (−0.316 µW). Since the propagation path of the radio signal is reversible, according to another aspect, the strong electric field area is also an area in which the reception strength of the signal, which is transmitted from the mobile terminal 2 and received by the on-board communication device 3, is equal to or higher than the strong electric field threshold. A region within 0.8 meter or less from the on-board communication device 3 tends to be the strong electric field area. When the mobile terminal 2 is existing in the strong electric field area of the front communication device 13A, the reception strength of the signal transmitted from the mobile terminal 2 becomes a sufficiently strong level.

The front communication device 13A may be disposed at a position where the outside of the vehicle compartment becomes the area beyond the viewable range of the front communication device 13A. For example, the front communication device 13A may be disposed in the vicinity of a boundary between a center console 43 and the instrument panel 44. The installation position of the front communication device 13A is not limited to this example. For example, inside the vehicle compartment, the front communication device 13A may be disposed in a foot area of the driver's seat or on a lateral surface of the door of the driver's seat. The front communication device 13A may be properly disposed at a position around the front seat so that the front area of the vehicle compartment becomes the strong electric field area.

The trunk communication device 13B is the vehicle inside communication device 13 which sets the trunk area in the vehicle compartment as the strong electric field area. The trunk communication device 13B may be disposed at a position where the outside of the vehicle compartment is likely to become the area beyond the viewable range of the trunk communication device 13B. For example, the trunk communication device 13B is disposed on a floor of the trunk room.

Both of the first rear communication device 13C and the second rear communication device 13D are the vehicle inside communication devices 13 each of which sets the rear area in the vehicle compartment as the strong electric field area. The first rear communication device 13C and the second rear communication device 13D may be disposed at positions where the outside of the vehicle compartment is likely to become the area beyond the viewable ranges of the first rear communication device 13C and the second rear communication device 13D.

The first rear communication device 13C may be disposed on an inner surface of the right side B pillar within the vehicle compartment. As another example, the first rear communication device 13C may be disposed on an inner surface of the door disposed on the right side of the vehicle Hv as a door corresponding to the rear seat (hereinafter, referred to as a rear right door) within the vehicle compartment. As another example, the first rear communication device 13C may be disposed on a right portion of a floor surface of the rear seat, or may be embedded in a right portion of a seating surface of the rear seat.

The second rear communication device 13D may be disposed on an inner surface of the left side B pillar within the vehicle compartment. As another example, the second rear communication device 13D may be disposed on an inner surface of the door disposed on the left side of the vehicle Hv as a door corresponding to the rear seat (hereinafter, referred to as a rear left door) within the vehicle compartment. As another example, the second rear communication device 13D may be disposed on a left portion of a floor surface of the rear seat, or may be embedded in a left portion of a seating surface of the rear seat. The first rear communication device 13C and the second rear communication device 13D may be disposed in the vicinity of a lower end of a rear surface of the backrest 41 which faces the rear seat.

The on-board system 1 according to the present embodiment includes two vehicle inside communication devices 13 that are respectively positioned on left portion and right portion and set the rear area as the strong electric field area. The placement of the vehicle inside communication devices 13 is not limited to this example. The on-board system 1 may be configured such that the rear area is set as the strong electric field area by a single vehicle inside communication device 13. In this configuration, the vehicle inside communication device 13 of the rear area may be embedded in the seating surface of the rear seat at a center portion of the rear seat in a vehicle width direction.

Figure 5:
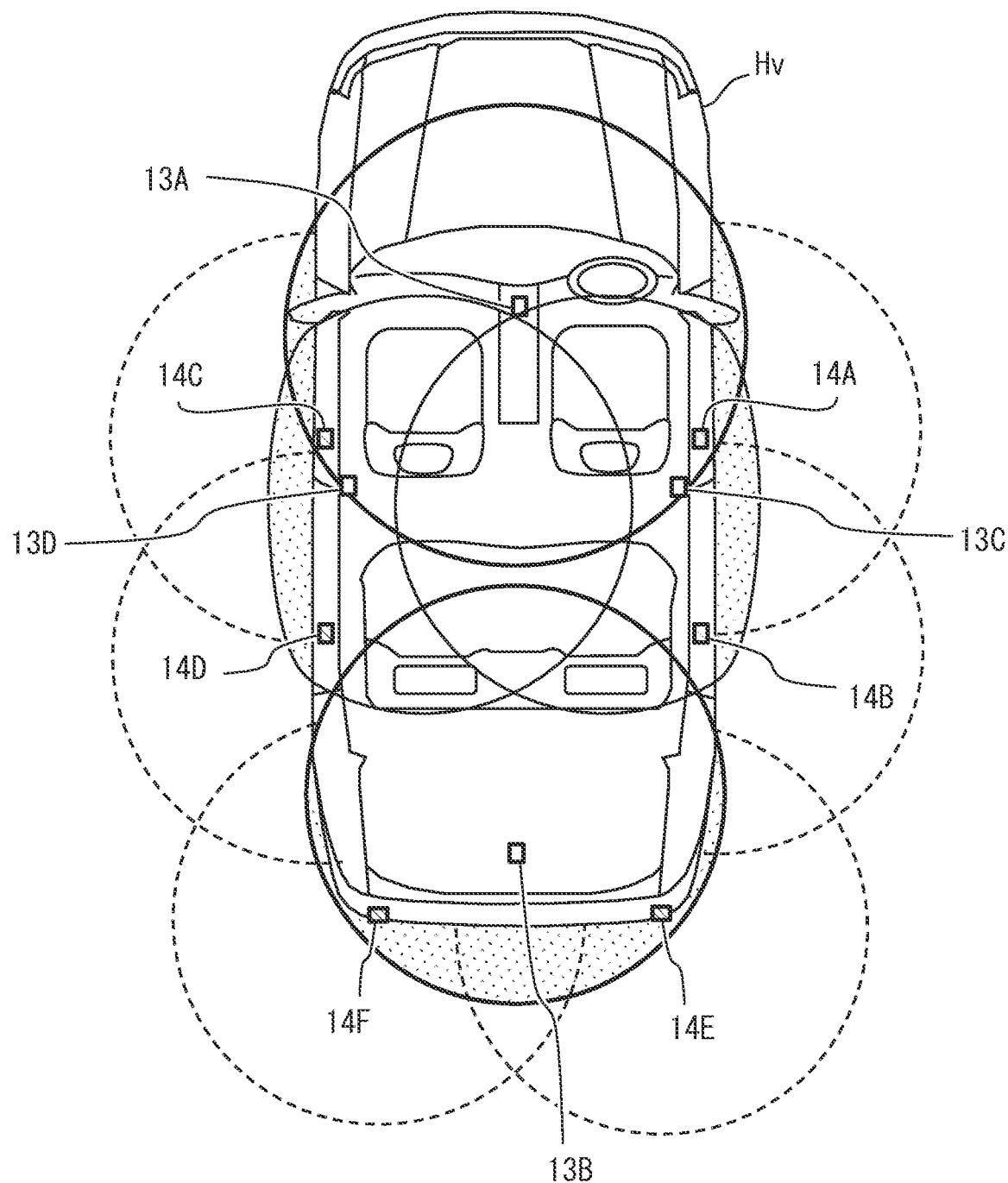
FIG. 5 is a diagram conceptually showing a strong electric field area formed by each on-board communication device.

According to the location of the vehicle inside communication devices 13 described above, an entire region of the vehicle compartment becomes the strong electric field area as shown in FIG. 5. That is, the entire vehicle compartment is filled with radio waves having strengths equal to or higher than the strong electric field threshold. FIG. 5 conceptually shows the strong electric field area provided by each on-board communication device 3 shown in FIG. 4. Solid line circles in FIG. 5 represent the strong electric field area provided by the vehicle inside communication device 13. Arcs of dashed lines represent the strong electric field area provided by the vehicle outside communication device 14 which will be described below. In FIG. 5, hatched regions by dotted pattern conceptually represent leakage regions formed by the vehicle inside communication device 13. The leakage region formed by the vehicle inside communication device 13 is a region in which the strong electric field area provided by the vehicle inside communication device 13 extends to an outside of the vehicle compartment. The leakage region is a region in which the signal transmitted by the vehicle inside communication device 13 reaches the outside of the vehicle compartment while maintaining the signal strength equal to or higher than a predetermined strong electric field threshold.

The configuration described above corresponds to a configuration in which each vehicle inside communication device 13 is disposed so that a strong electric field area is provided for each area divided by vehicle inside structures which may inhibit the propagation of the radio waves having the frequency used for the short range communication. The vehicle inside structures which may inhibit the propagation of the radio wave having the frequency used for the short range communication include the backrest 41 of the front seat and the backrest 42 of the rear seat. The areas partitioned by the vehicle inside structures include the front area, the rear area, and the trunk area.

The vehicle outside communication device 14 is provided by the on-board communication device 3 disposed on an outer surface of the vehicle Hv. In the present disclosure, the outer surface of the vehicle is a portion of the vehicle body which contacts with an outside space of the vehicle Hv. The outer surface of the vehicle includes a side surface, a rear surface, and a front surface of the vehicle Hv. In FIG. 2, for convenience, only one vehicle outside communication device 14 is illustrated. However, the on-board system 1 may include multiple vehicle outside communication devices 14. For example, at least one vehicle outside communication device 14 may be equipped to an outer surface of the driver's seat door, the roof portion, an engine hood, the pillars, or the like so that a predetermined area outside the vehicle compartment becomes the strong electric field area.

As shown in FIG. 4, the on-board system 1 according to the present embodiment includes, as the vehicle outside communication device 14, a first right communication device 14A, a second right communication device 14B, a first left communication device 14C, a second left communication device 14D, a first rear communication device 14E, and a second rear communication device 14F. The number of vehicle outside communication devices 14 included in the on-board system 1 can be properly changed. The number of vehicle outside communication devices 14 included in the on-board system 1 may be six or less. For example, the number of vehicle outside communication devices 14 may be two, three, or four. Alternatively, the number of vehicle outside communication devices 14 may be eight or more.

The first right communication device 14A is a vehicle outside communication device 14 that sets a periphery of the door corresponding to the front seat (hereinafter, referred to as a front right door) disposed on the right side of the vehicle Hv as the strong electric field area. In this configuration, since the driver's seat is disposed on the right side of the vehicle Hv, the front right door corresponds to the driver's seat door. The periphery of the front right door is a region that falls within a predetermined distance (for example, 1 meter) from the door handle disposed on the outer surface of the front right door. For example, the first right communication device 14A may be disposed in the vicinity of the outside door handle of the front seat door. The vicinity of the door handle also includes inside portion of the door handle. As another example, the first right communication device 14A may be disposed in the vicinity of the right front wheel. Alternatively, the first right communication device 14A may be disposed at a rocker portion below the front right door, a portion of the roof of the vehicle Hv which contacts with the upper end of the front right door, or the like.

The second right communication device 14B is the vehicle outside communication device 14 that sets the periphery of the rear right door as the strong electric field area. The periphery of the rear right door is a region that falls within a predetermined distance (for example, 1 meter) from the door handle disposed on the outer surface of the rear right door. For example, the second right communication device 14B may be disposed in the vicinity of the outside door handle of the rear seat door. The vicinity of the door handle also includes inside portion of the door handle. As another example, the second right communication device 14B may be disposed in the vicinity of the right rear wheel. Alternatively, the second right communication device 14B may be disposed at a rocker portion below the rear right door, a portion of the roof of the vehicle Hv which contacts with the upper end of the rear right door, or the like.

The first left communication device 14C and the second left communication device 14D are vehicle outside communication devices 14 paired with the first right communication device 14A and the second right communication device 14B, respectively. The first left communication device 14C may be disposed at a position opposite to the first right communication device 14A on the left surface of the vehicle Hv. Similarly, the second left communication device 14D may be disposed at a position opposite to the second right communication device 14B on the left surface of the vehicle Hv.

The first rear communication device 14E is the vehicle outside communication device 14 disposed in the vicinity of a right corner of the rear end of the vehicle. The second rear communication device 14F is the vehicle outside communication device 14 disposed in the vicinity of a left corner of the rear end of the vehicle. The first rear communication device 14E and the second rear communication device 14F are the vehicle outside communication devices 14 that generate the strong electric field areas in the rear area of the vehicle (that is, communications device for the rear area of the vehicle). In this example, two vehicle outside communication devices 14 are disposed for the rear area of the vehicle. However, the present disclosure is not limited to this configuration. Only one vehicle outside communication device 14 may be used for the rear area of the vehicle. In this case, the vehicle outside communication device 14 for the rear area of the vehicle may be disposed at a center portion of a trunk door, a center portion of a rear bumper, or the like in the vehicle width direction. The vehicle outside communication device 14 for the rear area of the vehicle may be disposed in the vicinity of the door handle of the trunk door or a license plate.

The installation position of each vehicle outside communication device 14 is not limited to the examples described above. The vehicle outside communication device 14 may be disposed on the outer surface of the vehicle Hv so as to cover the leakage region generated by the vehicle inside communication device 13 with a strong electric field area. The multiple vehicle outside communication devices 14 (for example, the second right communication device 14B on the right lateral surface) arranged on the left and right lateral surfaces of the vehicle Hv do not overlap with the multiple vehicle inside communication devices 13 (for example, the first rear communication device 13C) in a lateral view.

The vehicle outside communication device 14 may be disposed in the vicinity of a metallic body panel. In other words, a metal plate may be disposed on a rear surface of the vehicle outside communication device 14. The rear surface of the vehicle outside communication device 14 is disposed on a side of the vehicle compartment when viewed from the vehicle outside communication device 14. According to the example in which the vehicle outside communication device 14 is disposed on the surface of the body panel made of metal, the body panel functions as a reflection plate, and the center of the directivity of the vehicle outside communication device 14 can be directed toward the outside of the vehicle. In addition, since the body panel acts as the reflection plate, the vehicle compartment becomes the area beyond viewable range of the vehicle outside communication device 14. Thus, radio waves from the vehicle outside communication device 14 are less likely to enter the vehicle compartment, and the radio waves transmitted from the mobile terminal 2 existing in the vehicle compartment are less likely to be received by the vehicle outside communication device 14.

In the present embodiment, the various body panels are made of metal. Thus, according to the example of installing the vehicle outside communication device 14 on the door panel or the like as described above, the vehicle compartment becomes the area beyond the viewable range of each vehicle outside communication device 14, and the center of the directivity faces vehicle outside direction. In this example, the vehicle outside direction is a direction parallel to the horizontal plane of the vehicle and directed from the center of the vehicle toward the outside of the vehicle. The horizontal plane of the vehicle is a plane perpendicular to a height direction of the vehicle Hv.

When the vehicle outside communication device 14 is disposed on the metal body, a gain in the vehicle outside direction may be changed according to a distance between the metal body and the antenna 31. This is because a phase difference between a reflected wave reflected on the metal body and a direct wave changes according to the distance between the metal body and the antenna 31, and the radio waves are strengthened or attenuated. Points at which radio waves are attenuated may occur at every half wavelength.

The wavelength of the radio wave having 2.4 GHz frequency is about 12 cm. In a case where the distance between the metal body and the antenna 31 is 6 cm, the reflected wave and the direct wave in the vehicle outside direction are weakened, and the radiation gain in the vehicle outside direction is decreased. On the other hand, in a case where the distance between the metal body and the antenna 31 is 1.5 cm to 4.5 cm, a sensitivity ratio of the vehicle outside direction to the vehicle inside direction may be 20 dB or more. Therefore, the multiple vehicle outside communication devices 14 may be disposed so that a distance between the built-in antenna 31 and the metal body disposed on the rear surface of the vehicle outside communication device 14 is about 1.5 cm.

Both the vehicle inside communication device 13 and the vehicle outside communication device 14 are configured to mainly report the reception strength of the signal from the mobile terminal 2 to the authentication ECU 11. Therefore, hereinafter, various types of the vehicle inside communication device 13 and the vehicle outside communication device 14 are also referred to as strength observation devices. Each strength observation device provides the reception strength of the signals transmitted from the mobile terminal 2 to the authentication ECU 11. As described above, partial or entire of the strength observation devices may function as the data communication device 12.

The door handle button 15 is a button to be operated by the user to unlock or lock the door of the vehicle Hv. The door handle button 15 may be equipped to each door handle of the vehicle Hv. When depressed by the user, the door handle button 15 outputs an electric signal indicative of the depression operation to the authentication ECU 11. The door handle button 15 corresponds to a configuration via which the authentication ECU 11 receives a user's instruction to unlock or lock. A touch sensor may be used as the configuration for receiving at least one of the unlocking instruction or the locking instruction from the user. The touch sensor is a device that detects a touch on the door handle made by the user. The touch sensor as the configuration for receiving the unlocking instruction or the locking instruction from the user may be equipped to each door handle of the vehicle Hv.

The start button 16 is a push switch that enables the user to start a driving source (for example, an engine) of the vehicle. When the user performs a push operation on the start button 16, the start button 16 outputs an electric signal indicating the push operation to the authentication ECU 11. As an example, the vehicle Hv is a vehicle provided with an engine as the driving source, but the present disclosure is not limited to this example. The vehicle Hv may be an electric vehicle or a hybrid vehicle. When the vehicle Hv is a vehicle provided with a motor as the driving source, the start button 16 is a switch for starting the motor for driving.

The engine ECU 17 is an ECU configured to control an operation of the engine mounted on the vehicle Hv. For example, in response to the engine ECU 17 receiving a start instruction signal that instructs starting of the engine from the authentication ECU 11, the engine ECU 17 starts the engine.

The body ECU 18 is an ECU configured to control on-board actuators 19 in response to a request from the authentication ECU 11. The body ECU 18 is communicably connected to various on-board actuators 19 and various on-board sensors. In this example, the on-board actuators 19 may include a door lock motor configuring a locking mechanism of each door, an actuator for adjusting a seat position (hereinafter, referred to as a seat actuator), and the like. The on-board sensors in this example may include a courtesy switch and the like equipped to each door. The courtesy switches are sensors configured to detect opening and closing of the door. For example, the body ECU 18 outputs a predetermined control signal to the door lock motor equipped to each door of the vehicles Hv in response to a request from the authentication ECU 11, thereby locking and unlocking the doors of the vehicle Hv.

(Functions of Authentication ECU 11)

Figure 6:
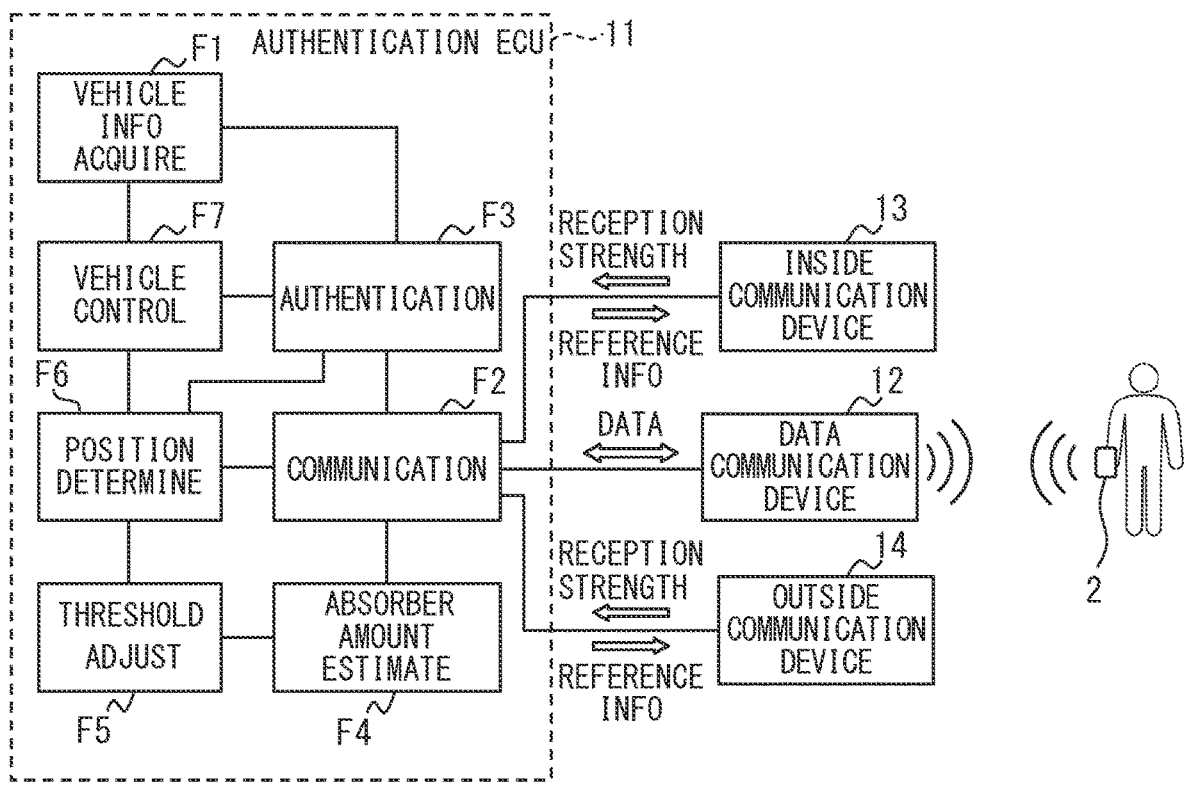
FIG. 6 is a diagram showing a function of an authentication ECU.

The authentication ECU 11 executes the position determination program to provide functions corresponding to functional blocks shown in FIG. 6. In other words, the authentication ECU 11 includes, as functional blocks, a vehicle information acquiring unit F1, a communication processing unit F2, an authentication processing unit F3, an absorber amount estimation unit F4, a threshold adjusting unit F5, a position determination unit F6, and a vehicle control unit F7.

Partial or entire function executed by the authentication ECU 11 may be implemented as hardware using logic circuits or the like. An example implemented by hardware also include an example implemented by using one or more ICs. Partial or entire functional blocks included in the authentication ECU 11 may be implemented by a combination of a software executed by the CPU 111 and an electronic circuit.

The vehicle information acquiring unit F11 acquires various pieces of information indicating a state of the vehicle Hv (hereinafter, referred to as vehicle information) from sensors, ECUs (for example, body ECU 18), switches, and the like equipped to the vehicle Hv. For example, the vehicle information includes an open/closed state of the door, a locked/unlocked state of each door, pressing operation on the door handle button 15, pressing operation on the start button 16, or the like.

The vehicle information acquiring unit F1 specifies a current state of the vehicle Hv based on the various information described above. For example, when the engine is off and all of the doors are locked, the vehicle information acquiring unit F11 determines that the vehicle Hv is in parked state. It is needless to say that the condition for determining that the vehicle Hv is in parked state may be properly set, and various determination conditions and the like may be applied to the determination.

The acquisition of the information indicating the locked/unlocked state of each door corresponds to the determination of the locked/unlocked state of each door and the detection of the locking operation/unlocking operation of the door by the user. The acquisition of electric signals from the door handle button 15 and the start button 16 corresponds to detection of the user operation made on those buttons. The vehicle information acquiring unit F1 corresponds to a configuration for detecting the user's operation on the vehicle Hv, such as opening and closing of the door, pressing of the door handle button 15, pressing of the start button 16, and the like. The vehicle information described hereinafter includes the user operation made on the vehicle Hv.

The types of information included in the vehicle information are not limited to the examples described above. The vehicle information also includes a shift position detected by a shift position sensor (not shown), a detection result of a brake sensor for detecting depression operation on a brake pedal, and the like. The operation state of the parking brake may also be included in the vehicle information.

The communication processing unit F2 is configured to perform transmission and reception of data to and from the mobile terminal 2 in cooperation with the data communication device 12. For example, the communication processing unit F2 generates data addressed to the mobile terminal 2, and outputs the data to the data communication device 12. With this configuration, the communication processing unit F2 is able to transmit a signal corresponding to the data as radio waves. The communication processing unit F2 receives data from the mobile terminal 2 via the data communication device 12. In the present embodiment, the wireless communication between the authentication ECU 11 and the mobile terminal 2 may be configured to be executed in an encrypted manner. The authentication ECU 11 functioning as the communication processing unit F2 acquires channel information from the data communication device 12. Then, the authentication ECU 11 specifies a channel used by the data communication device 12 for performing a communication with the mobile terminal 2.

The authentication ECU 11 acquires, from the data communication device 12, the terminal ID of the mobile terminal 2 to which the data communication device 12 is communicably connected. According to the configuration described above, even when the vehicle Hv is shared by multiple users, the authentication ECU 11 can specify a user who is existing in the vicinity of the vehicle Hv based on the terminal ID of the mobile terminal 2 to which the data communication device 12 is connected in communicable manner.

The communication processing unit F2 distributes the channel information and the terminal ID acquired from the data communication device 12 to each strength observation device as reference information. The channel information shown in the reference information enables each strength observation device to recognize the channel to be received among the many channels included in the Bluetooth standard in order to receive the signal from the mobile terminal 2. Even when the strength observation device receives signals from multiple devices, the strength observation device can specify the device whose reception strength of the signal needs to be reported to the authentication ECU 11, based on the terminal ID indicated in the reference information.

The authentication processing unit F3 is configured to authenticate the mobile terminal 2 in cooperation with the data communication device 12 (hereinafter, referred to as an authentication process). The short range communication for authentication is executed by the data communication device 12 in encrypted manner. That is, the authentication process is performed by an encrypted communication. The authentication process itself may be executed by various methods such as a challenge-response method. A detailed description of the authentication process will be omitted. It is assumed that data (for example, encryption key) required for the authentication process is preliminarily stored in the mobile terminal 2 and the authentication ECU 11.

For example, a time at which the authentication processing unit F3 executes the authentication process may be set to a time at which the communication connection between the data communication device 12 and the mobile terminal 2 is established. The authentication processing unit F3 may be configured to execute the authentication process at a predetermined cycle while the data communication device 12 and the mobile terminal 2 are in communication connection. The authentication processing unit F3 may be configured such that the encrypted communication for the authentication process is executed by using a predetermined user operation on the vehicle Hv as a trigger, for example, in response to a pressing operation made on the start button 16 by the user.

In the present embodiment, the authentication ECU 11 and the mobile terminal 2 are configured to encrypt the data communication for authentication or the like in order to improve security. However, the present disclosure is not limited to this configuration. As another example, the authentication ECU 11 and the mobile terminal 2 may be configured to perform the data communication for authentication or the like without encryption.

In the Bluetooth standard, the communication connection between the data communication device 12 and the mobile terminal 2 is established means that a communication partner of the data communication device 12 is the mobile terminal 2 registered in advance. Therefore, the authentication ECU 11 may be configured to determine that the mobile terminal 2 has been successfully authenticated in response to the communication connection being successfully established between the data communication device 12 and the mobile terminal 2.

The absorber amount estimation unit F4 estimates the amount of the absorber that absorbs the radio waves of short range communication and is existing in the vehicle compartment with reference to a communication status (for example, the strength of reception signal) of the on-board communication devices 3 disposed in the vehicle compartment. The threshold adjusting unit F5 adjusts the inside corresponding value Pin based on the estimation result of the absorber amount estimation unit F4. The operation of the absorber amount estimation unit F4 and the threshold adjusting unit F5 will be described later.

The radio wave absorber may be, for example, a person. Food such as meat and water and small animals, such as pets also correspond to radio wave absorbers. This is because these objects contain water and can absorb radio waves having frequency of 2.4 GHz. A child seat may also correspond to a radio wave absorber. The radio wave absorber is an element that has dynamically (for example, in each traveling of the vehicle) changing amount and position in the vehicle compartment The radio wave absorber may be an object having a property of absorbing radio waves of short range communication that may be brought into the vehicle compartment during the normal use of the vehicle Hv. For example, the normal use of the vehicle Hv refers to shopping, excursion, commuting, transportation, and the like. The radio wave absorber here refers to an object that absorbs radio waves, such as an occupant or the like, and is not limited to an object manufactured for the purpose of absorbing radio waves (for example, a radio wave absorbing sheet). In a case where the radio wave absorbing sheet is brought into the vehicle compartment by the user, the radio wave absorbing sheet also corresponds to the radio wave absorber.

The position determination unit F6 is configured to determine whether the mobile terminal 2 is existing in the vehicle compartment based on the reception strength of the signal transmitted from the mobile terminal 2. The reception strength of the signal is provided by each strength observation device. The mobile terminal 2 is basically carried by the user, and the determination of the position of the mobile terminal 2 corresponds to the determination of the position of the user. As a preparatory process for determining the position of the mobile terminal 2, the position determination unit F6 successively acquires the reception strength of the signal successively transmitted from the mobile terminal 2 from the multiple strength observation devices included in the on-board system 1, and stores the acquired reception strengths in the RAM 112 by distinguishing the acquired reception strengths for each acquisition source.

Then, the position determination unit F6 determines whether the mobile terminal 2 is existing in the vehicle compartment based on the reception strength, which is provided by each strength observation device and stored in the RAM 112, and various determination thresholds registered in the flash memory 113. The specific operation of the position determination unit F6, that is, the method of determining the position of the mobile terminal 2 executed by the position determination unit F6 based on the reception strength provided by each strength observation device will be described in detail later. The determination result of the position determination unit F6 is referred to by the vehicle control unit F7.

The vehicle control unit F7 is configured to execute a vehicle control according to the position of the mobile terminal 2 (in other words, the user) and the state of the vehicle Hv in cooperation with the body ECU 18 or the like in response to the authentication of the mobile terminal 2 executed by the authentication processing unit F3 being successful. The state of the vehicle Hv is determined by the vehicle information acquiring unit F1. The position of the mobile terminal 2 is determined by the position determination unit F6.

For example, when the mobile terminal 2 is existing outside of the vehicle compartment and the user presses the door handle button 15 while the vehicle Hv is in parked state, the vehicle control unit F7 unlocks the door locking mechanism in cooperation with the body ECU 18. For another example, when the mobile terminal is determined to be existing in the vehicle compartment by the position determination unit F6 and it is detected that the start button 16 has been pressed by the user, the vehicle control unit F5 starts the engine in cooperation with the engine ECU 17.

Basically, the vehicle control unit F7 is configured to execute a vehicle control according to the position of the user and the state of the vehicle Hv with the user operation made on the vehicle Hv as a trigger. However, some vehicle controls that can be executed by the vehicle control unit F7 may be automatically executed according to the position of the user without requiring the user's operation to be made on the vehicle Hv.

(Connection Related Process)

Figure 7:
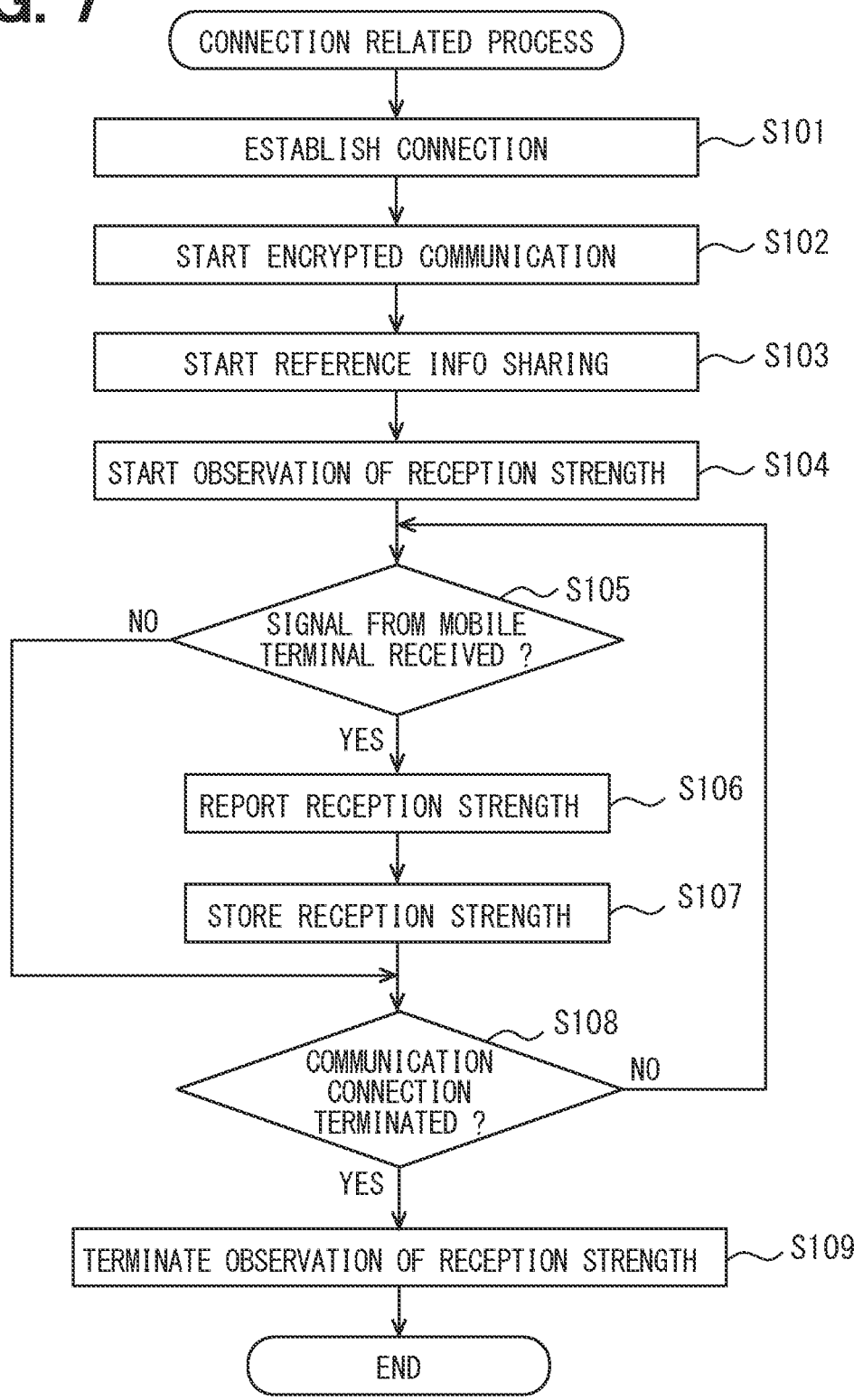
FIG. 7 is a diagram showing flowchart of a connection related process executed by the on-board system.

The following will describe a connection related process executed by the on-board system 1 with reference to a flowchart shown in FIG. 7. The connection related process is related to the establishment of the communication connection between the on-board system 1 and the mobile terminal 2. The connection related process shown in FIG. 7 may start, for example, in response to the data communication device 12 receiving an advertisement packet from the mobile terminal 2.

In a state where the communication connection between the data communication device 12 and the mobile terminal 2 is not established, the operation of the strength observation device may be deactivated in order to suppress a dark current. The data communication device 12 may always operate in a standby state in order to improve the responsiveness to an approach of the user. In the standby state a signal (for example, an advertisement packet) from the mobile terminal 2 can be received by the data communication device 12.

In S101, the data communication device 12 establishes a communication connection (that is, a connection) with the mobile terminal 2, and the process proceeds to S102. When the communication connection with the mobile terminal 2 is established, the data communication device 12 provides, to the authentication ECU 11, the terminal ID of the mobile terminal 2 that is communicably connected with the data communication device 12. In a case where the strength observation device is in a sleep mode at the time when the communication connection between the data communication device 12 and the mobile terminal 2 is established, the authentication ECU 11 outputs, to the strength observation device, a predetermined control signal to switch from the sleep mode to the standby state. For example, the sleep mode is a state in which the receiving function of a signal is deactivated. The sleep mode includes a state in which the power is turned off.

In S102, the data communication device 12 periodically performs an encrypted communication based on an instruction from the authentication ECU 11. The content of the data exchanged at this time may be any content as long as the content requests the mobile terminal 2 to transmit a response signal. The data content may be data for authenticating the mobile terminal 2, such as a challenge code. By periodically executing the wireless communication with the mobile terminal 2, the authentication ECU 11 is able to confirm that the mobile terminal 2 is existing within the communication area.

In S103, the data communication device 12 and the authentication ECU 11 cooperate with one other to start sharing of the reference information. Specifically, the data communication device 12 successively provides, to the authentication ECU 11, the terminal ID and the channel information of the mobile terminal 2 with which the communication connection is established. The authentication ECU 11 successively distributes the channel information and the terminal ID provided by the data communication device 12 toward each of the multiple strength observation devices as the reference information.

In S104, each strength observation device start observing of the reception strength of signal from the mobile terminal 2 by use of the reference information provided by the authentication ECU 11. That is, the strength observation device sets a channel assigned with a number indicated in the channel information as the reception target among multiple channels defined in the Bluetooth standard. The strength observation device successively changes the target channel to be received in accordance with the channel information provided by the authentication ECU 11.

According to the configuration described above, even when the mobile terminal 2 and the data communication device 12 perform the wireless communication with one another by the frequency hopping method, the reception strength of the signal from the mobile terminal 2 can be acquired, and the reception strength can be successively reported to the authentication ECU 11. That is, the on-board communication devices 3 included in the on-board system 1 can detect the reception strength of a signal transmitted from the mobile terminal 2 in a state where the confidentiality (in other words, security) of the communication between the on-board system 1 and the mobile terminal 2 is ensured.

In S105, the strength observation device determines whether a signal including the terminal ID indicated in the reference information has been received. In response to the signal including the terminal ID indicated in the reference information being received, the process proceeds to S106. In S106, the reception strength of the received signal is reported to the authentication ECU 11. In S105 and S106, each strength observation device reports, to the authentication ECU 11, the reception strength of the signal including the terminal ID indicated in the reference information among the signals received in the channel indicated in the channel information. In a case where the signal from the mobile terminal 2 has not been received for a predetermined period in S105, the process proceeds to S108.

In S107, the authentication ECU 11 executes a process of storing, in the RAM 112, the reception strength provided from each strength observation device by distinguishing the reception strength from one other corresponding to each strength observation device serving as the provider. Then, the process proceeds to S108. In S108, the authentication ECU 11 and the data communication device 12 cooperate with one other to determine whether the communication connection with the mobile terminal 2 has been terminated. For example, the termination of communication connection with the mobile terminal may include a case where the data communication device 12 fails to receive a signal from the mobile terminal 2. When the communication with the mobile terminal 2 is terminated, an affirmative determination is made in S108, and the process proceeds to S109. On the other hand, when the communication with the mobile terminal 2 is still maintained, the process returns to S105.

In S109, the authentication ECU 11 outputs a predetermined control signal to the strength observation device, and ends observing of the reception strength of the signal transmitted from the mobile terminal 2. For example, the authentication ECU 11 may control, for example, the strength observation device to switch to the sleep mode. The process terminates after execution of S109.

(Absorber Amount Estimation Process)

Figure 8:
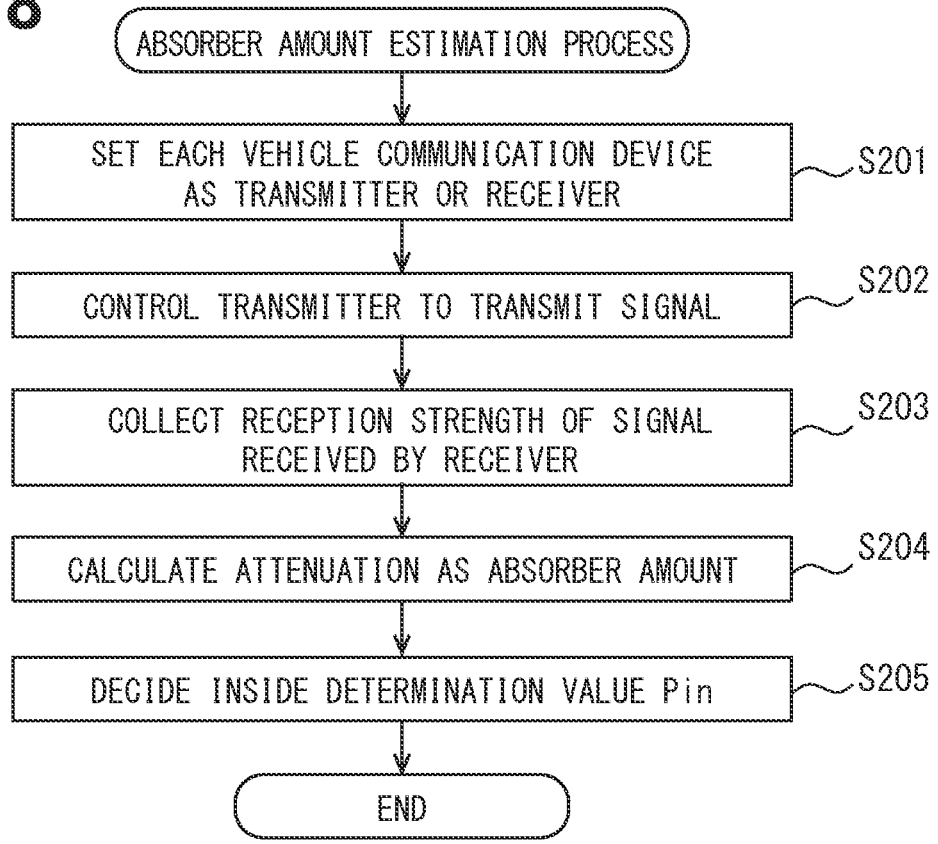
FIG. 8 is a flowchart of an absorber amount estimation process executed by the authentication ECU.

The following will describe an absorber amount estimation process executed by the authentication ECU 11 with reference to a flowchart shown in FIG. 8. The absorber amount estimation process determines the amount of radio wave absorbers (that is, the absorber amount) existing in the vehicle compartment. The absorber amount estimation process is performed, for example, at a predetermined absorber amount estimation cycle in a state where the communication connection between the data communication device 12 and the mobile terminal 2 is established. The absorber amount estimation cycle is set to, for example, 1 second. The absorber amount estimation cycle may also be set to 400 milliseconds.

The absorber amount estimation process may be executed in response to an occurrence of a predetermined event as a trigger, such as the establishment of communication connection between the data communication device 12 and the mobile terminal 2, closing of door which is in open state, and pressing of the start button 16 by the user. The absorber amount estimation process may also be executed in response to a predetermined operation made by the user on the vehicle Hv for using the vehicle as a trigger. The predetermined operation may include opening/closing of the door, pressing of the start button 16, operation of the shift lever or the like. As an example, the absorber amount estimation process of the present embodiment includes S201 to S205.

In S201, the absorber amount estimation unit F4 sets a role of each vehicle inside communication device 13 that performs the wireless communication for estimating the absorber amount. Specifically, any one of the multiple vehicle inside communication devices 13 is set as the transmitter, and at least one of the remaining vehicle inside communication devices 13 is set as the receiver. The transmitter is the communication device that plays a role of transmitting a wireless signal. The receiver is the communication device that receives a signal transmitted from the transmitter and reports the reception strength of the signal to the authentication ECU 11. The transmitter and the receiver may be selected from the vehicle inside communication devices 13 installed in the vehicle compartment.

In the present embodiment, as an example, the front communication device 13A is set as the transmitter, and each of the remaining three vehicle inside communication devices 13 is set as the receiver. That is, the trunk communication device 13B, the first rear communication device 13C, and the second rear communication device 13D operate as the receiver. As another example, the trunk communication device 13B may be set as the transmitter, or another vehicle inside communication device 13 may be set as the transmitter. It is sufficient that there is at least one receiver, and it is not always necessary to operate, as the receiver, all of the remaining vehicle inside communication devices 13 except the one operating as transmitter.

In S202, the absorber amount estimation unit F4 cooperates with the communication processing unit F2 to control the front communication device 13A operating as the transmitter to transmit a predetermined radio signal including the own communication device number. For example, the signal transmitted by the front communication device 13A operating as the transmitter may be an advertisement signal. In the present embodiment, as an example, it is assumed that the communication device operating as the transmitter transmits a wireless signal based on the instruction from the authentication ECU 11. However, the present disclosure is not limited to this configuration. Alternatively, the transmitter may be configured to voluntarily transmit the advertisement signal at a regular time interval. Whether the vehicle inside communication device 13 operates as the transmitter (in other words, the operation mode of the communication device) is controlled by the instruction from the authentication ECU 11 (specifically, the absorber amount estimation unit F4). A predetermined wireless signal including the communication device number transmitted by the transmitter corresponds to the inside device transmission signal. The communication device number of the transmitter corresponds to transmission source information.

In S203, each vehicle inside communication device 13 operating as the receiver reports, to the authentication ECU 11, the reception strength of the radio signal (for example, the advertisement signal) transmitted from the transmitter. For convenience, in a current absorber amount estimation process, the reception strength of the signal transmitted from the front communication device 13A and observed by each of the trunk communication device 13B, the first rear communication device 13C, and the second rear communication device 13D is represented as Po(AB), Po(AC), and Po(AD). In this representation, "P" of "Po" indicates electric power (Power), and "o" indicates the power is an observed value. In a case where the observed values Po(AB), Po(AC), and Po(AD) are not distinguished from one other, they are described as observed value Po.

In the above configuration, as an example, the observed value Po of each vehicle inside communication device 13 is not the result obtained based on one time signal reception by the vehicle inside communication device 13. The observed value Po is obtained by calculating an average value of the reception strengths of multiple times (specifically, the latest M times) within the latest predetermined time period. This is because, according to this configuration, the influence of the instantaneous fluctuation of the reception strength can be mitigated. The observed value Po may be the median value or the maximum value of the latest M-time reception strengths. The observed value Po may be an average value of the reception strengths obtained by removing the maximum value and the minimum value from the latest M-time reception strengths. Herein, M may be set as 5 as an example. The value of M may also be set to 3 or 10. As another example, N may be set to 1. The configuration in which M is set to 1 corresponds to a configuration in which the latest time reception strength is directly adopted as the observed value Po. The observed value Po calculated based on the reception strength of the latest M-time reception strengths in the vehicle inside communication device 13 corresponds to an individual strength representative value corresponding to the receiver.

The multiple on-board communication devices 3 of the present embodiment are configured to perform wireless communication in accordance with the Bluetooth standard. That is, the frequency used for wireless communication is successively changed under frequency hopping method. Such a configuration corresponds to an example of a configuration in which the transmitter transmits the wireless signal as the inside device transmission signal using multiple frequencies. The receiver of the present embodiment is configured to successively detect the reception strength of the inside device transmission signals transmitted successively using multiple frequencies. The absorber amount estimation unit F4, which calculates the observed value Po based on the reception strengths determined at multiple time points, corresponds to a configuration which calculates the observed value Po as the individual strength representative value corresponding to the receiver using the reception strength for each frequency.

In S204, the absorber amount estimation unit F4 calculates an attenuation amount S that indicates the absorbed amount of the radio waves by the radio wave absorber existing in the vehicle compartment based on the reception strength of the transmitter reported by each receiver and the strength model data of the communication devices previously stored in the flash memory 113. The strength model data of the communication devices indicates estimated value of the reception strength of the signal transmitted from the transmitter and received by each receiver in a state (hereafter, referred to as an empty state) where no object except the structures installed or embedded in the vehicle compartment exists in the vehicle compartment.

Figures 9, 10:
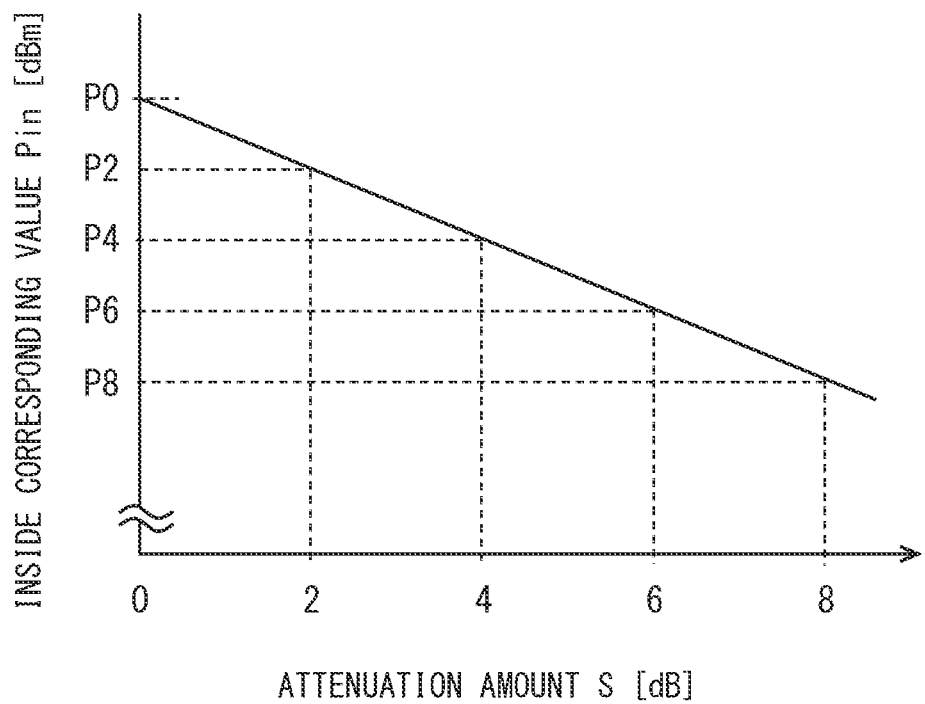
FIG. 9 is a diagram showing strength model data of the communication devices.
FIG. 10 is a graph showing a relationship between an attenuation amount that indicates absorber amount and a vehicle inside corresponding value.

The strength model data of the communication devices in the present embodiment shows an estimated value of the reception strength observed in each receiver with respect to the signal transmitted from transmitter in the empty state of the vehicle. FIG. 9 conceptually shows a structure of the strength model data of the communication devices according to the present embodiment. In the drawing, Pm(AB) represents an estimated value of the reception strength of the signal that is transmitted from the front communication device 13A operating as the transmitter and received by the trunk communication device 13B operating as the receiver. Pm(AC) represents an estimated value of the reception strength of the signal that is transmitted from the front communication device 13A operating as the transmitter and received by the first rear communication device 13C operating as the receiver. Pm(AD) represents an estimated value of the reception strength of the signal that is transmitted from the front communication device 13A operating as the transmitter and received by the second rear communication device 13D operating as the receiver. In the drawing, "m" of "Pm" indicates an estimated value (that is, a model value).

The estimated value of the reception strength may be determined by the manufacturer (for example, the designer) of the position estimation system 100. The estimated value of the reception strength in a certain vehicle inside communication device 13 is the average value of multiple actually measured values obtained by instructing the front communication device 13A to transmit signals by multiple times under a state where the inside of vehicle compartment is set to the empty state. In a case where the estimated values PM(AB), Pm(AC), and Pm(AD) are not distinguished from one other, they are described as estimated value Pm. The estimated value Pm corresponds to the estimated strength value. The state in which the vehicle compartment is set to the empty state corresponds to the model environment. The flash memory 113 that stores the strength model data of the communication devices corresponds to the strength model storage.

The structures installed or embedded in the vehicle compartment may include, for example, a seat, a steering wheel, or the like. The empty state corresponds to a state in which no object is brought into the vehicle compartment by a user or a passenger and no occupant is on board. The empty state corresponds to, for example, the vehicle compartment environment at the time of factory shipment or delivery.

The reception strength of the signal transmitted from the transmitter at each receiver may be affected by the seat position, such as the driver's seat. The strength model data of the communication devices in the present embodiment is obtained by instructing the transmitter to subsequently transmit the signal by multiple times in the empty state of vehicle and in a state where the seat position is set to a predetermined default position. It is assumed that the strength model data of the communication devices is determined based on the observed value of the reception strength at the receiver in the above-described state.

In S203, the absorber amount estimation unit F4 calculates a difference (hereinafter, referred to as model differential value) between the estimated value of the reception strength registered as the strength model data of the communication devices and the reception strength observed by each vehicle inside communication device 13 in the current absorber amount estimation process. For example, the value obtained by subtracting the reception strength Po(AB)

observed by the trunk communication device 13B from the estimated reception strength Pm(AB) of the trunk communication device 13B is calculated as the model differential value ΔP(AB). For other vehicle inside communication devices 13, the model differential values ΔP(AC) and ΔP(AD), which are the differences between the estimated value and the observed value, are calculated in similar way. Then, the average value thereof is calculated as the attenuation amount S. When the model differential values ΔP(AB), ΔP(AC), and ΔP(AD) are not distinguished from one other, they are described as the model differential value ΔP. The model differential value ΔP is a value obtained by subtracting the observed value Po from the estimated value Pm. The attenuation amount S may be the median value of the model differential values ΔP corresponding to respective vehicle inside communication devices 13, or may be a value obtained by weighting and adding with use of a predetermined weighting coefficient.

The model differential value ΔP, which is the difference between the estimated value Pm and the observed value Po for in each vehicle inside communication device 13 as calculated above and the attenuation amount S obtained by averaging the model differential values indicate a degree of influence (actually, the attenuation amount of the reception strength) caused by the radio wave absorbers brought into the vehicle compartment. That is, the larger the attenuation amount S, the larger the amount of radio wave absorbers. Thus, the attenuation amount S is a parameter that functions as an index of the amount of the radio wave absorbers existing in the vehicle compartment.

In S205, the threshold adjusting unit F5 refers to the mapping data indicating the relationship between the absorber amount and threshold stored in the flash memory 113, and decides an inside corresponding value Pin corresponding to the attenuation amount S calculated in S204. As shown in FIG. 10, the mapping data indicating the relationship between the absorber amount and threshold is a graph that indicates the inside corresponding value Pin in relation to the absorber amount (actually, attenuation amount S). In the drawing, P0 represents a vehicle inside corresponding value Pin to be set when the attenuation amount S is 0 dB, and P2 represents a vehicle inside corresponding value Pin to be set when the attenuation amount S is 2 dB. P4 represents a vehicle inside corresponding value Pin to be set when the attenuation amount S is 4 dB, and P6 represents a vehicle inside corresponding value Pin to be set when the attenuation amount S is 6 dB. P8 represents a vehicle inside corresponding value Pin to be set when the attenuation amount S is 8 dB. The vehicle inside corresponding value Pin in relation to each attenuation amount S may be appropriately designed by a test or the like. P0 corresponds to the vehicle inside corresponding value Pin (hereinafter, default threshold) to be set in the empty state of the vehicle.

The default threshold P0 may be set with reference to a minimum value of an inside device strength representative value which is observed in a state where only the mobile terminal 2 is existing in the vehicle compartment. The inside device strength representative value is a parameter that typically indicates the reception strength of each vehicle inside communication device 13, and its definition (calculation method) will be described later. The minimum value of the inside device strength representative value that is observed in a state where only the mobile terminal 2 is existing in the vehicle compartment may be determined based on the result of a test that measures the inside device strength representative value at each observation point in the vehicle compartment.

When a test result indicates that the minimum value of the inside device strength representative value which is observed in a state where only the mobile terminal 2 is existing in the vehicle compartment is −35 dBm, the default value P0 may be set to −38 dBm which gives a predetermined margin to the minimum value of −35 dBm. The default threshold P0 is an inside corresponding value Pin determined based on the minimum value of the inside device strength representative value that is observed in a state where only the mobile terminal 2 is existing in the vehicle compartment. Thus, the default threshold P0 corresponds to the inside corresponding value Pin set under an assumption that no one is on-board of the vehicle Hv. From such a viewpoint, the default threshold P0 is also described as an empty vehicle estimated value.

P5 may be set to a value obtained by giving a predetermined margin to the minimum value of the inside device strength representative value that is observed in a state where the mobile terminal 2 together with five adults are on-board in the vehicle compartment. The inside corresponding value Pin that is set under an assumption that the number of occupants equal to the riding capacity are on-board of the vehicle Hv (hereinafter, a full state) may be referred to as full capacity estimated value. The full capacity refers to a state where the occupancy rate is 100%. For example, the full capacity estimated value corresponds to a state where five adults are on board the vehicle Hv.

The mapping data indicating the relationship between the absorber amount and threshold may be defined so that the inside corresponding value Pin decreases with an increase of the attenuation amount S. For example, the inside corresponding value Pin related to each attenuation amount S may be set as a value obtained by subtracting the attenuation amount S from P0. The inside corresponding value Pin related to the attenuation amount S may be determined based on a test result obtained by changing the number of occupants and the positions of seats existing in the vehicle compartment.

The process terminates after execution of S205. The inside corresponding value Pin determined in this flow is used in the position determination process. In the present embodiment, as an example, the inside corresponding value Pin according to the amount of absorbers is expressed in a map format. However, the method of expressing the inside corresponding value Pin according to the amount of absorbers is not limited to map format. It can be expressed in various different ways. The inside corresponding value Pin to be set when the attenuation amount S is larger than 0 may be set to a value obtained by subtracting the value corresponding to the attenuation amount S from the default threshold P0. For example, the inside corresponding value Pin to be set when the attenuation amount S is larger than 0 may be a value obtained by subtracting the attenuation amount S specified by the absorber amount estimation unit F4 from the default threshold P0.

The threshold adjusting unit F5 may be configured so that the inside corresponding value Pin can be uniquely determined according to the amount of absorber (substantially, the attenuation amount S) estimated by the absorber amount estimation unit F4. In FIG. 10, the inside corresponding value Pin is linearly decreased with respect to an increase in the amount of absorber, but the configuration of setting the inside corresponding value Pin is according to the amount of absorber is not limited to this example. The inside corresponding value pin may be set to decrease in a stepwise manner with an increase of the amount of the absorber, or may be set to decrease in a curved manner with an increase of the amount of the absorber.

(Position Determination Process)

Figure 11:
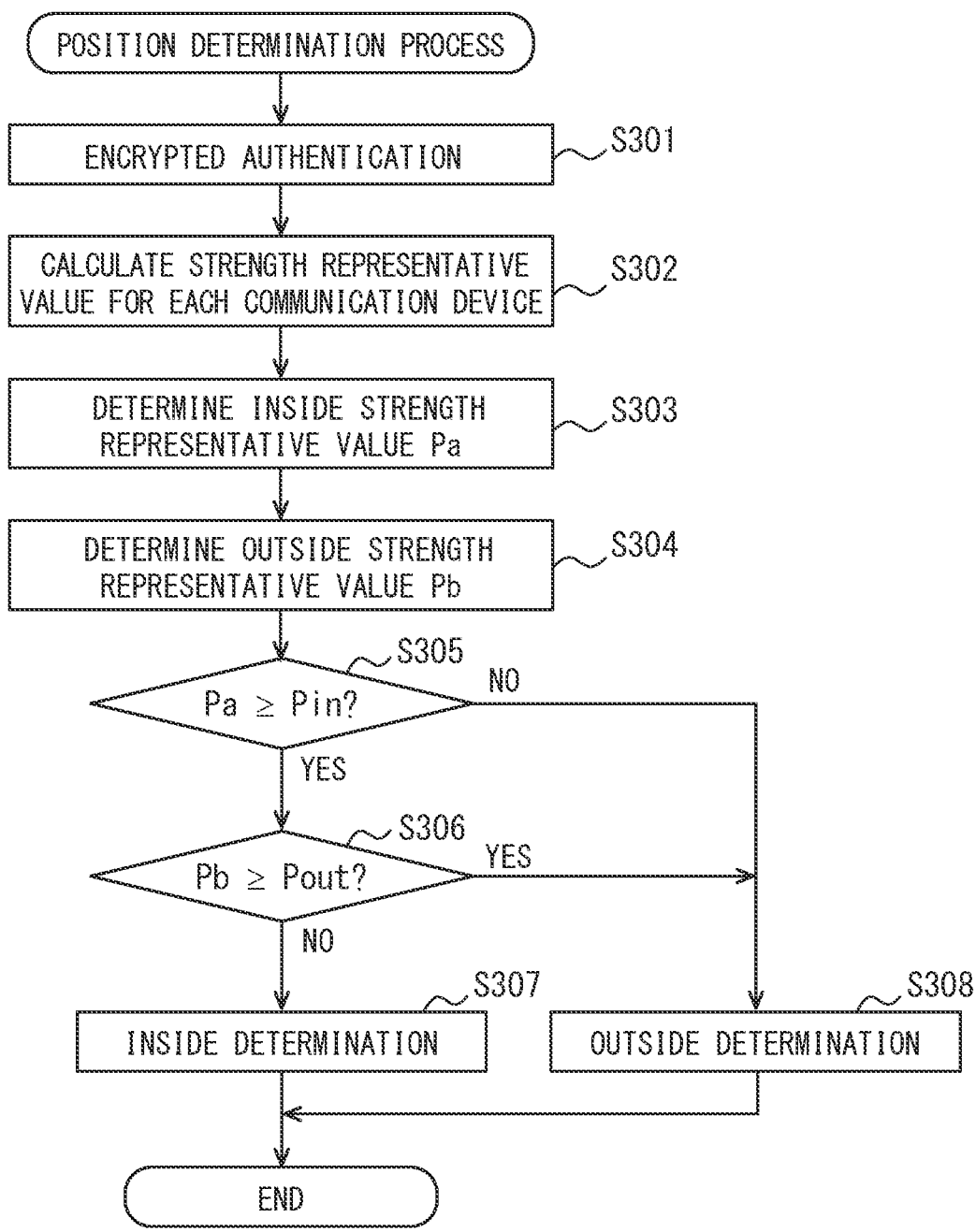
FIG. 11 is a flowchart of a position determination process executed by the authentication ECU.

The following will describe a position determination process executed by the authentication ECU 11 with reference to a flowchart shown in FIG. 11. The position determination process is a process for determining the position of the mobile terminal 2. The position determination process is performed, for example, at a predetermined position determination cycle in a state where the communication connection between the data communication device 12 and the mobile terminal 2 is established. The position determination cycle may be set to, for example, 200 milliseconds. It is needless to say that the position determination cycle may be set to 100 milliseconds or 300 milliseconds.

First, in S301, the authentication processing unit F3 executes a process of authenticating the mobile terminal 2 in cooperation with the data communication device 12, and the process proceeds to S302. Alternatively, S301 may be omitted. The authentication process can be appropriately changed according to an authentication time of the mobile terminal 2.

In S302, the position determination unit F6 calculates the individual strength representative value of each strength observation device based on the reception strength of the signal received by each strength observation device. As described above, the reception strength of the signal received by each strength observation may be stored in the RAM 112. The individual strength representative value of one strength observation device is a value representative of the reception strength of the signal received within a latest predetermined time period by the strength observation device. As an example, the individual strength representative value is an average value of the reception strengths of signals received in latest N times. Such an individual strength representative value corresponds to a moving average value of the reception strength.

In the present embodiment, N may be set to a natural number of 2 or more, and is set to 5 as an example. In this example, the position determination unit F6 calculates the moving average value by use of the reception strengths of signals transmitted from the mobile terminal 2 and acquired (in other words, sampled) at the latest five time points. It is needless to say that N may be set to 10, 20, or the like. As another example, N may be set to 1. The configuration in which N=1 corresponds to a configuration in which the latest reception strength is directly adopted as the individual strength representative value.

More specifically, in S302, the position determination unit F6 calculates, as the individual strength representative value of the front area communication device 13A, an average value of the reception strengths with the latest five reception strengths provided from the front area communication device 13A as a population. Similarly, for other vehicle inside communication devices 13, such as the trunk communication device 13B, the first rear communication device 13C, and the second rear communication device 13D, the position determination unit F6 calculate the average value of the latest five reception strengths provided from the corresponding vehicle inside communication devices 13.

The position determination unit F6 calculates, as an individual strength representative value in the first right communication device 14A, an average value of the latest five reception strengths provided from the first right communication device 14A with the latest five reception strengths as a population. Similarly, for other vehicle outside communication devices 14, such as the second right communication device 14B, the first left communication device 14C, the second left communication device 14D, the first rear communication device 14E, and the second rear communication device 14F, the position determination unit F6 calculate the average with the latest five reception strengths provided from corresponding vehicle outside communication device 14 as a population.

The individual strength representative value of the strength observation device in which the number of reception strengths stored in the RAM 112 is less than N may be calculated by adding a value corresponding to a lower limit value of the reception strength detectable by the on-board communication device 3 as the missed reception strength representative value. For example, the lower limit value of the reception strength detectable by the on-board communication device 3 may be determined by the configuration of the on-board communication device 3. For example, the lower limit may be set to −60 dBm or the like.

According to the above configuration, for example, even when only a part of the multiple strength observation devices included in the on-board system 1 can receive the signal from the mobile terminal 2 due to the position of the mobile terminal 2, the subsequent process can be executed by using the received signal. For example, even when the first left communication device 14C and the second left communication device 14D fail to receive the signal from the mobile terminal 2 because the mobile terminal 2 is existing on the right side of the vehicle Hv, the individual strength representative value for each strength observation device can be calculated.

In the present embodiment, the average value of the latest N-time reception strengths is calculated as the individual strength representative value, but the present disclosure is not limited to this configuration. The individual strength representative value may be the median value or the maximum value of the last N-time reception strengths. The individual strength representative value may be an average value of the reception strengths obtained by removing the maximum value and the minimum value from the latest N-time reception strengths. The individual strength representative value may be a value obtained by removing a variation component of the instantaneous reception strength. The process proceeds to S303 after execution of S302.

Figure 12:
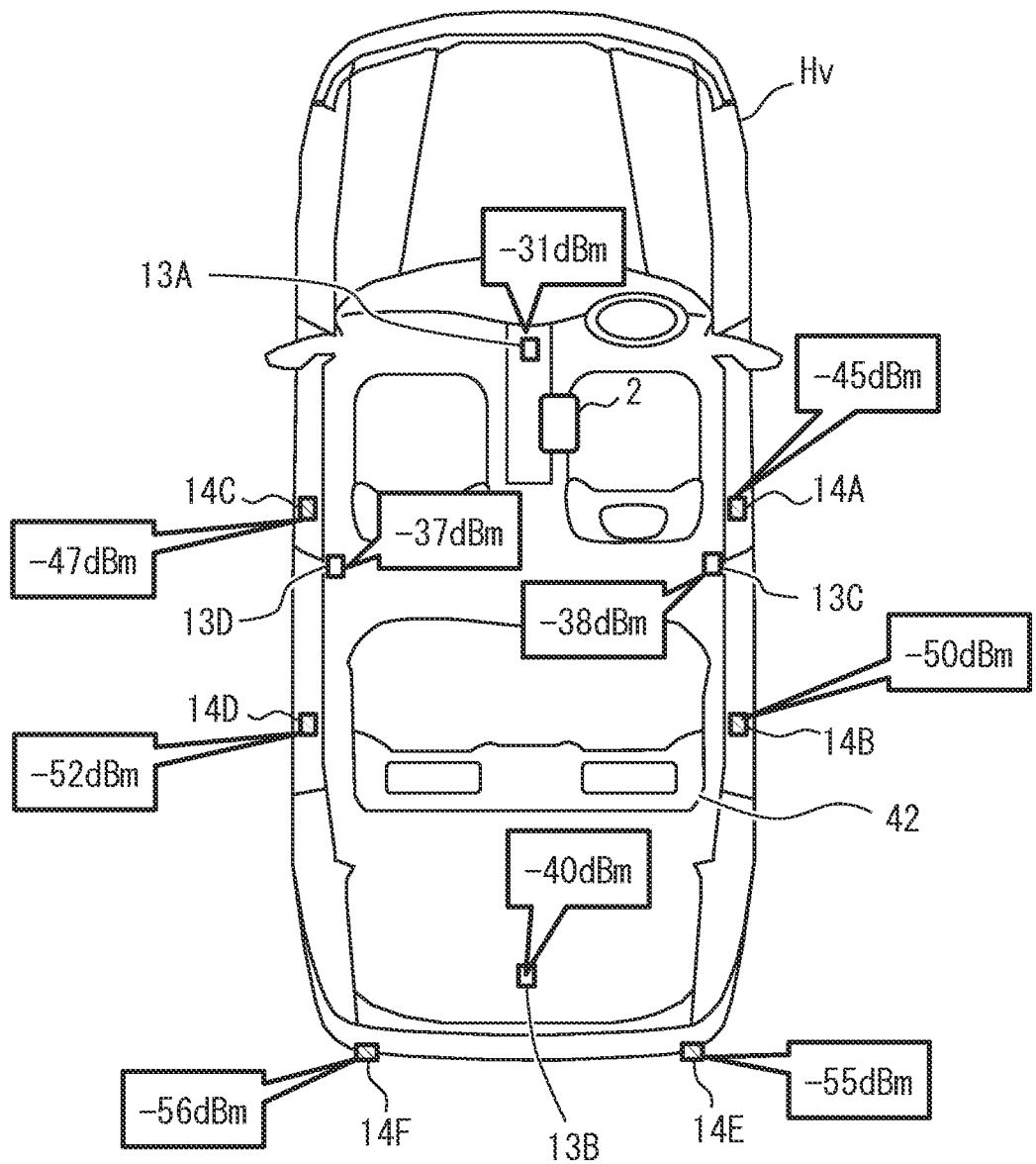
FIG. 12 is a diagram showing a method of determining an inside device strength representative value and an outside device strength representative value.

In S303, the position determination unit F6 determines an inside device strength representative value Pa based on the individual strength representative values of the respective vehicle inside communication devices 13. As an example, the inside device strength representative value Pa is the maximum value of the individual strength representative values of the respective vehicle inside communication devices 13. For example, as shown in FIG. 12, when the individual strength representative values of the multiple vehicle inside communication devices 13 are −31 dBm, −37 dBm, −38 dBm, and −40 dBm, the inside device strength representative value Pa is set to −31 dBm. The process proceeds to S304 after execution of S303. As another example, the inside device strength representative value Pa may be an average value or a median value of the individual strength representative values of respective vehicle inside communication devices 13.

In S 304, the position determination unit F6 determines an outside device strength representative value Pb based on the individual strength representative values of the vehicle outside communication devices 14. For example, as shown in FIG. 12, when the individual strength representative values of the vehicle outside communication devices 14 are −45 dBm, −50 dBm, −47 dBm, −52 dBm, −55 dBm, and −60 dBm, the outside device strength representative value Pb is determined to be −45 dBm. The outside device strength representative value Pb may be determined using the same determination rule as the inside device strength representative value. The position determination unit F6 in the present embodiment employs the maximum value of the individual strength representative values of the vehicle outside communication devices 14 as the outside device strength representative value Pb. The process proceeds to S305 after execution of S304.

In S305, the position determination unit F6 determines whether the inside device strength representative value Pa is equal to or greater than the inside corresponding value Pin set by the threshold adjusting unit F5. As described above, the inside corresponding value Pin is a threshold for determining that the mobile terminal 2 is existing in the vehicle compartment, and the inside corresponding value Pin is successively adjusted by the threshold adjusting unit F5. In a case where the inside device strength representative value Pa is less than the inside corresponding value Pin, the mobile terminal 2 can be determined to be existing outside of the vehicle compartment. Since each of the vehicle inside communication devices 13 is disposed so that the entire area in the vehicle compartment becomes the strong electric field area, an area in which the inside device strength representative value Pa is equal to or greater than the inside corresponding value Pin may also be generated outside of the vehicle compartment. The case in which the inside device strength representative value Pa is equal to or greater than the inside corresponding value Pin includes a case in which the mobile terminal 2 is existing in the leakage region outside of the vehicle compartment.

In the determination of S305, in response to the inside device strength representative value Pa is equal to or greater than the inside corresponding value Pin, an affirmative determination is made in S305, and the process proceeds to S306. On the other hand, in response to the inside device strength representative value Pa is less than the inside corresponding value Pin, a negative determination is made in S305, and S308 is executed.

In S306, the position determination unit F6 determines whether the outside device strength representative value Pb is equal to or greater than the outside corresponding value Pout. As described above, the outside corresponding value Pout is a threshold value for determining that the mobile terminal 2 is existing outside of the vehicle compartment. The outside corresponding value Pout may be set based on the maximum value of the outside device strength representative value which can be observed when the mobile terminal 2 is existing in the vehicle compartment. The maximum value of the outside device strength representative value that is observed in a state where the mobile terminal 2 is existing in the vehicle compartment may be determined based on the result of a test that measures the outside device strength representative value at each observation point where the mobile terminal 2 is disposed in the vehicle compartment.

When a test result indicates that the maximum value of the outside device strength representative value Pb which is observed in a state where the mobile terminal 2 is existing in the vehicle compartment is −40 dBm, the outside corresponding value Pout may be set to −37 dBm which gives a predetermined margin (3 dBm) to the maximum value of −40 dBm. Since the outside corresponding value Pout is set to be equal to or greater than the maximum value of the outside device strength representative value which is observed when the mobile terminal 2 is existing in the vehicle compartment, the situation in which the outside device strength representative value Pb is equal to or greater than the outside corresponding value Pout means that the mobile terminal 2 is existing outside of the vehicle compartment.

Each of the vehicle outside communication devices 14 is mainly disposed so that the vehicle outside region becomes the strong electric field area, and the leakage region of the vehicle inside communication device 13 is included in the strong electric field area generated by the vehicle outside communication device 14. When the mobile terminal 2 is existing in the strong electric field area of the vehicle outside communication device 14, the outside device strength representative value Pb becomes a sufficiently high value (specifically, equal to or greater than the outside corresponding value Pout). Therefore, when the mobile terminal 2 is existing in the leakage region, the outside device strength representative value Pb can be expected to be equal to or greater than the outside corresponding value Pout. Hereinafter, the region in which the outside device strength representative value Pb is equal to or greater than the outside corresponding value Pout outside of the vehicle compartment is referred to as an outside device dominant region.

The multiple vehicle outside communication devices 14 are disposed so that the outside device dominant region covers the leakage region. As a result, even when the inside device strength representative value Pa is equal to or greater than the inside corresponding value Pin due to the presence of the mobile terminal 2 in the leakage region, the outside device strength representative value Pb becomes equal to or greater than the outside corresponding value Pout. That is, when the inside device strength representative value Pa is equal to or greater than the inside corresponding value Pin, whether the mobile terminal 2 is existing in the vehicle compartment or in the leakage region outside of the vehicle compartment can be determined by comparing a magnitude of the outside device strength representative value Pb with the outside corresponding value Pout.

In the determination of S306, in response to the outside device strength representative value Pb is equal to or greater than the outside corresponding value Pout, an affirmative determination is made in S306, and the process proceeds to S308. On the other hand, in response to the outside device strength representative value Pb is less than the outside corresponding value Pout, a negative determination is made in S306, and the process proceeds to S307.

In S307, the position determination unit F6 determines that the mobile terminal 2 is existing in the vehicle compartment, and the process is ended. In S308, the position determination unit F6 determines that the mobile terminal 2 is existing outside of the vehicle compartment, and the process is ended. The determination results in S307 and S308 are stored in the RAM 112 as the position information of the mobile terminal 2, and are referred to by the vehicle control unit F7 or the like.

(Operation and Effects of Embodiment)

In the embodiment described above, the vehicle inside communication devices 13 are disposed so that the entire area in the vehicle compartment becomes the strong electric field area. That is, the vehicle compartment is filled with the radio waves of the short range communication. According to the placement of the vehicle inside communication devices 13 described above, when the mobile terminal 2 is existing in the vehicle compartment, the inside device strength representative value Pa becomes a sufficiently high value. The vehicle outside communication devices 14 are disposed on the outer surface of the vehicle Hv so that the strong electric field areas of the vehicle outside communication devices 14 include (in other words, cover) the leakage region of the vehicle inside communication devices 13.

The vehicle outside communication devices 14 are disposed to cover the leakage region of the vehicle inside communication devices 13. With this configuration, the outside device strength representative value Pb that is observed when the mobile terminal 2 is existing in the leakage region is sufficiently higher than the outside device strength representative value Pb that is observed when the mobile terminal 2 is existing in the vehicle compartment. That is, the vehicle outside communication devices 14 are installed so that the reception strength at the vehicle outside communication device 14 when the mobile terminal 2 is existing in the leakage region is superior to the reception strength at the vehicle outside communication device 14 when the mobile terminal 2 is existing in the vehicle compartment.

According to the configuration in which the strength observation devices are disposed in the manner described above, when the mobile terminal 2 is existing in the vehicle compartment, the individual strength representative value in at least one of the multiple vehicle inside communication devices 13 is equal to or greater than the inside corresponding value Pin. Thus, when the mobile terminal 2 is existing in the vehicle compartment, the inside device strength representative value Pa also becomes equal to or greater than the inside corresponding value Pin. The outside corresponding value Pout is set to a sufficiently high value. Thus, when the mobile terminal 2 is existing in the vehicle compartment, the outside device strength representative value Pb is less than the outside corresponding value Pout. Therefore, the authentication ECU 11 can determine that the mobile terminal 2 is existing in the vehicle compartment under a condition that the inside device strength representative value Pa is equal to or greater than the inside corresponding value Pin and the outside device strength representative value Pb is less than the outside corresponding value Pout.

When the mobile terminal 2 is existing in the leakage region outside of the vehicle compartment, the outside device strength representative value Pb becomes equal to or greater than the outside corresponding value Pout. This is because the vehicle outside communication device 14 is disposed so as to cover the leakage region of the vehicle inside communication device 13 with the strong electric field area. Thus, the authentication ECU 11 can determine that the mobile terminal 2 is existing outside of the vehicle compartment (specifically, in the leakage region) under a condition that the inside device strength representative value Pa is equal to or greater than the inside corresponding value Pin and the outside device strength representative value Pb is equal to or greater than the outside corresponding value Pout.

When the mobile terminal 2 is existing outside of the vehicle compartment in a region other than the leakage region, the inside device strength representative value Pa is less than the inside corresponding value Pin. Thus, the authentication ECU 11 can determine that the mobile terminal 2 is existing outside of the vehicle compartment (specifically, outside of the leakage region), under a condition that the inside device strength representative value Pa is less than the inside corresponding value Pin.

In the configuration described above, since the entire area in the vehicle compartment is set to the strong electric field area, it can be determined that the mobile terminal 2 is existing in the vehicle compartment even when the mobile terminal 2 is existing at a corner portion of the vehicle compartment. According to the configuration described above, the leakage region of the vehicle inside communication device 13 is excluded from a vehicle compartment determination area by use of the reception strength of the vehicle outside communication device 14. The vehicle compartment determination area is an area in which the authentication ECU 11 determines that the mobile terminal 2 is existing in the vehicle compartment based on the reception strength of the vehicle inside communication device 13.

The configuration described above is different from a conventional design concept in which the vehicle inside communication device 13 is disposed so that a signal of the vehicle inside communication device 13 does not leak to the outside of the vehicle compartment. The configuration described above is based on a technical idea that, on the assumption that the signal of the vehicle inside communication device 13 leaks to the outside of the vehicle compartment, the possibility of erroneous determination in the leakage region is corrected by use of the reception strength of the vehicle outside communication device 14. Based on the technical idea described above, the strong electric field area of the vehicle inside communication device 13 can be set to be broader. As a result, the number of vehicle inside communication devices 13 disposed in the vehicle compartment can be reduced.

Further, in the embodiment described above, the vehicle inside communication device 13 is disposed in each area, such as the front area, the rear area, and the trunk area which are divided by the vehicle compartment structure that may inhibit the propagation of radio waves. According to this configuration, since the entire region in the vehicle compartment becomes the strong electric field area, the possibility of erroneous determination that the mobile terminal 2 is existing outside of the vehicle compartment caused by the position of the mobile terminal 2 in the vehicle compartment can be reduced.

(Effects of Adjusting Inside Corresponding Value According to Attenuation Amount)

The authentication ECU 11 of the present embodiment adjusts the inside corresponding value Pin according to the attenuation amount S specified by the absorber amount estimation unit F4. The effect of adjusting the inside corresponding value Pin according to the attenuation amount S will be described by introducing a first comparative configuration and a second comparative configuration.

In both of the first and second comparative configurations, whether the mobile terminal 2 exists in the vehicle compartment is determined by using a constant inside corresponding value Pin regardless of the number of occupants. The first comparative configuration determines whether the terminal 2 exists in the vehicle compartment by using an inside corresponding value Pin determined based on the reception strength observed in a state where five adults are on board in a vehicle Hv having a riding capacity of five persons (that is, full state). The second comparative configuration determines whether the mobile terminal 2 exists in the vehicle compartment by using an inside corresponding value Pin determined based on the reception strength observed in the empty state of the vehicle.

Figure 13:
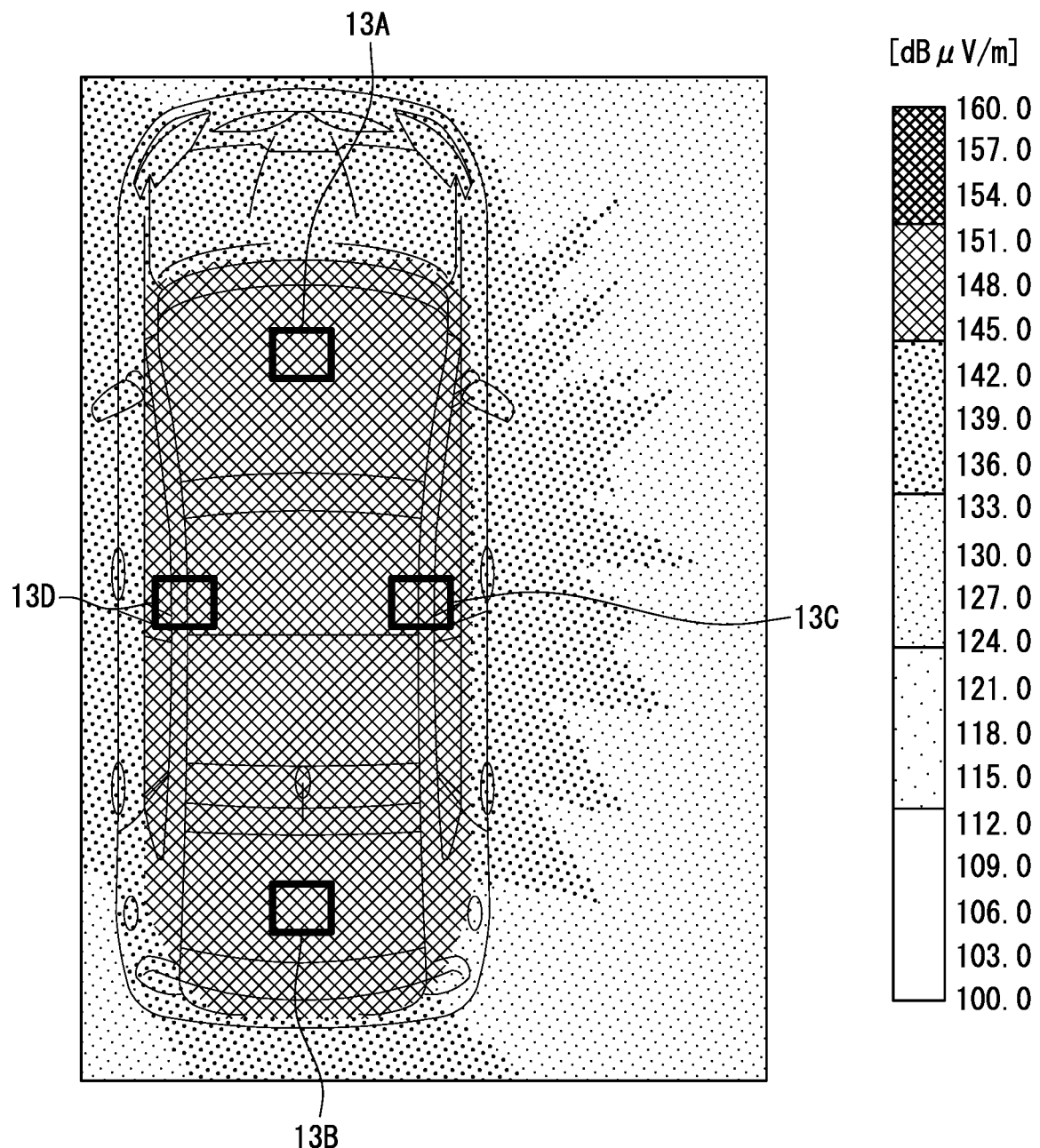
FIG. 13 is a diagram showing a test result of a relationship between a position of the mobile terminal and the inside device strength representative value in an empty state of the vehicle.
Figure 14:
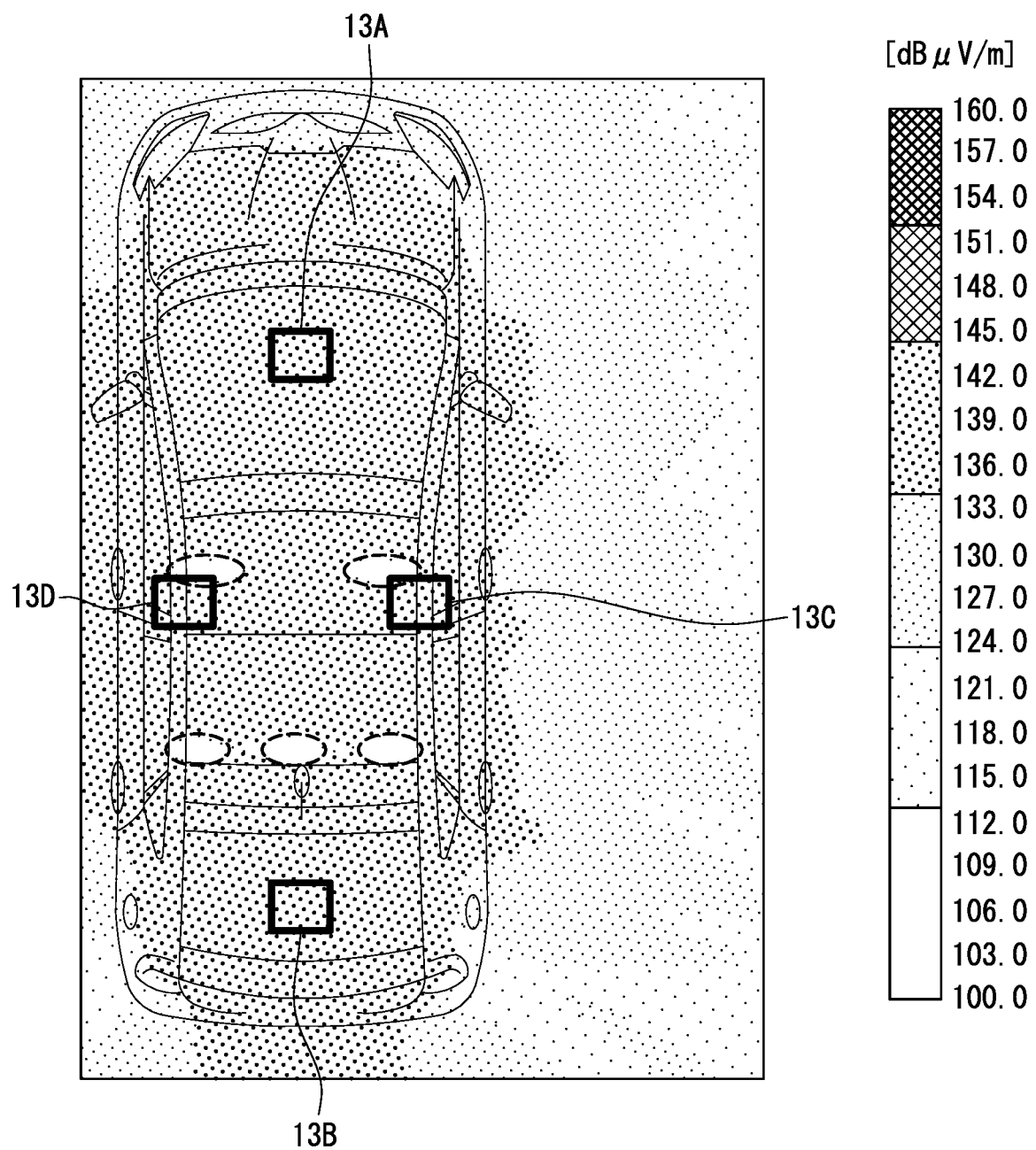
FIG. 14 is a diagram showing a test result of a relationship between a position of the mobile terminal and the inside device strength representative value in a full state of the vehicle.

As shown in FIG. 13 and FIG. 14, when the number of occupants is large (for example, when five adults are on board), the signal transmitted from the mobile terminal 2 is absorbed by the body of each occupant. Compared with the case of no occupant in the vehicle compartment, the inside device strength representative value Pa is relatively low. Thus, the inside corresponding value Pin used in the first comparative configuration has a relatively low value. The inside corresponding value Pin used in the second comparative configuration has a relatively high value.

Each of FIG. 13 and FIG. 14 shows a result of testing a relationship between the inside device strength representative value Pa and the position of the mobile terminal 2 in the vehicle compartment and in the right region outside of the vehicle compartment. The test result shown in FIG. 13 represents a value of the inside device strength representative value when the mobile terminal 2 is disposed at the same height as the windows of the vehicle Hv, specifically, at a position where a height from a road surface is 1.1 meter, in a state where all of the doors of the vehicle Hv are closed and the vehicle is in empty state. The test result shown in FIG. 14 represents a value of the inside device strength representative value when the mobile terminal 2 is disposed at the same height as the windows of the vehicle Hv, specifically, at a position where a height from a road surface is 1.1 meter, in a state where all of the doors of the vehicle Hv are closed and the vehicle is in full state. The area surrounded by the ellipse of broken line in FIG. 14 indicates the area where the occupant exists.

Figure 15:
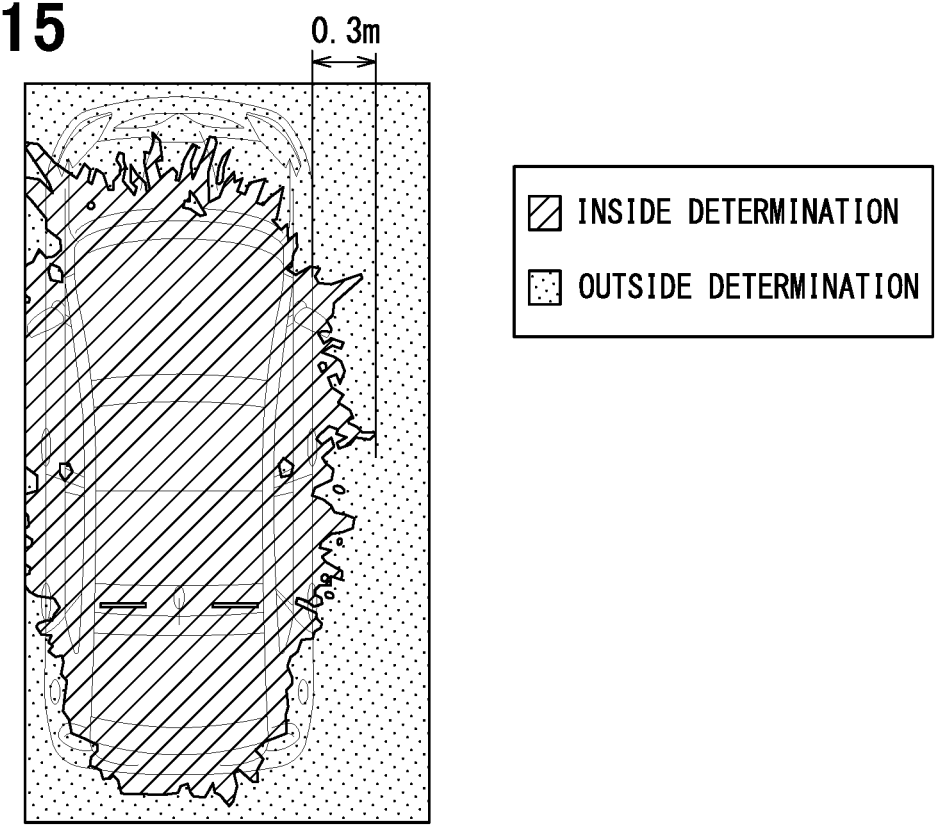
FIG. 15 is a diagram showing a test result of an operation executed by a first comparative configuration.

In the first comparative configuration, the reception strength of the signal transmitted from the mobile terminal existing outside of the vehicle compartment tends to exceed the inside corresponding value Pin. This is because the inside corresponding value Pin determined based on the reception strength observed in the full state of the vehicle has a relatively low value. As a result, as shown in FIG. 15, although the mobile terminal 2 is existing outside of the vehicle compartment, it may be erroneously determined that the mobile terminal 2 is existing in the vehicle compartment. FIG. 15 shows a test result of a determination result of the position of the mobile terminal 2 determined by the first comparative configuration in which the mobile terminal 2 is disposed at the same height as the windows of the vehicle Hv, specifically, at a position where a height from a road surface is 1.1 meter, in a state where all of the doors of the vehicle Hv are closed. As shown in FIG. 15, with the first comparative configuration, it may be erroneously determined that the mobile terminal 2 exists in the vehicle compartment even at a distance of 30 cm (=0.3 m) from the window portion.

Figure 16:
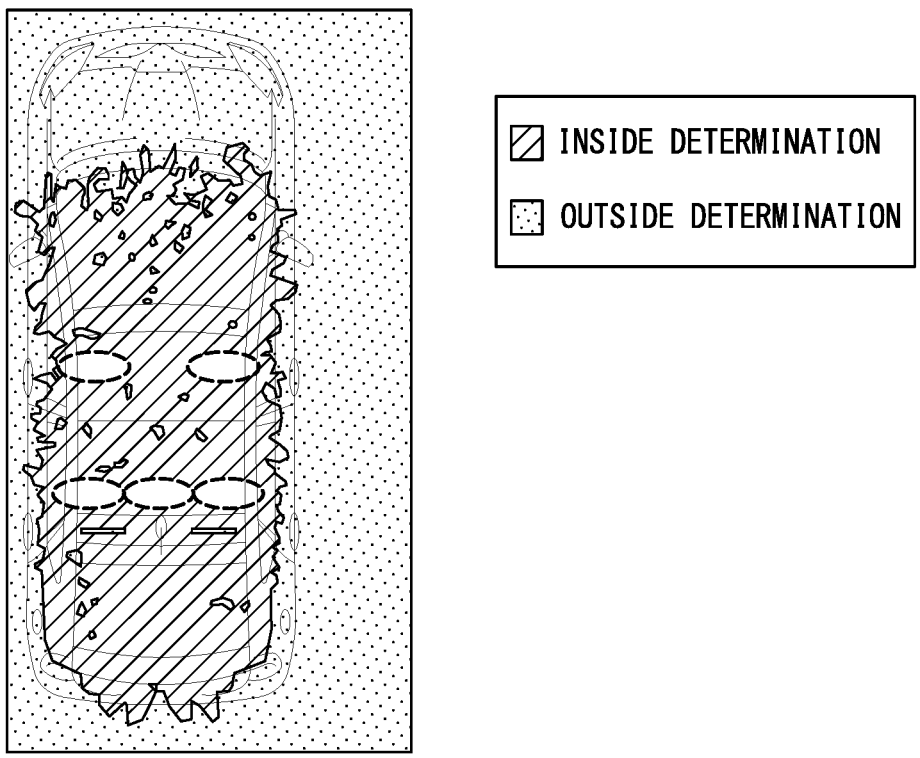
FIG. 16 is a diagram showing a test result of an operation executed by a second comparative configuration.

In the second comparative configuration, when multiple occupants are existing in the vehicle compartment, the reception strength of the signal transmitted from the mobile terminal brought into the vehicle compartment is unlikely to exceed the inside corresponding value Pin. This is because the inside corresponding value Pin determined based on the reception strength observed in the empty state of the vehicle has a relatively high value, and the signal transmitted from the mobile terminal 2 may be absorbed by the body of occupant. As a result, as shown in FIG. 16, although the mobile terminal 2 is existing inside of the vehicle compartment, it may be erroneously determined that the mobile terminal is existing out of the vehicle compartment. FIG. 16 shows a test result of a determination result of the position of the mobile terminal 2 determined by the second comparative configuration in a state where all of the doors of the vehicle Hv are closed and five adults having average body sizes are on board. FIG. 16 shows the test results when the mobile terminal 2 is positioned on a plane having a height of 1.1 meter from the road surface. As shown in FIG. 16, with the second comparative configuration, it may be erroneously determined that the mobile terminal 2 exists out of the vehicle compartment at several areas in the vehicle compartment. The area surrounded by the ellipse of broken line in the drawing indicates the area where the occupant exists. In the example shown in FIG. 16, the position of the mobile terminal 2 is erroneously determined in an area corresponding to 2% of the entire vehicle compartment area.

Compared with the first and second comparative configurations, in the configuration of the present embodiment, the inside corresponding value Pin to be set is decreased with an increase of the attenuation amount S. For example, in a state where no one is on board (that is, when the vehicle is in empty state), a relatively small attenuation amount S can be expected to be calculated. Thus, a value close to the default threshold value P0 is set as the inside corresponding value Pin. In this configuration, since a relatively high value is set as the inside corresponding value Pin in the empty state of the vehicle, the possibility of erroneous determination that the mobile terminal 2 is determined to be existing in the vehicle compartment even though the mobile terminal 2 exists outside of the vehicle compartment can be reduced.

Figure 17:
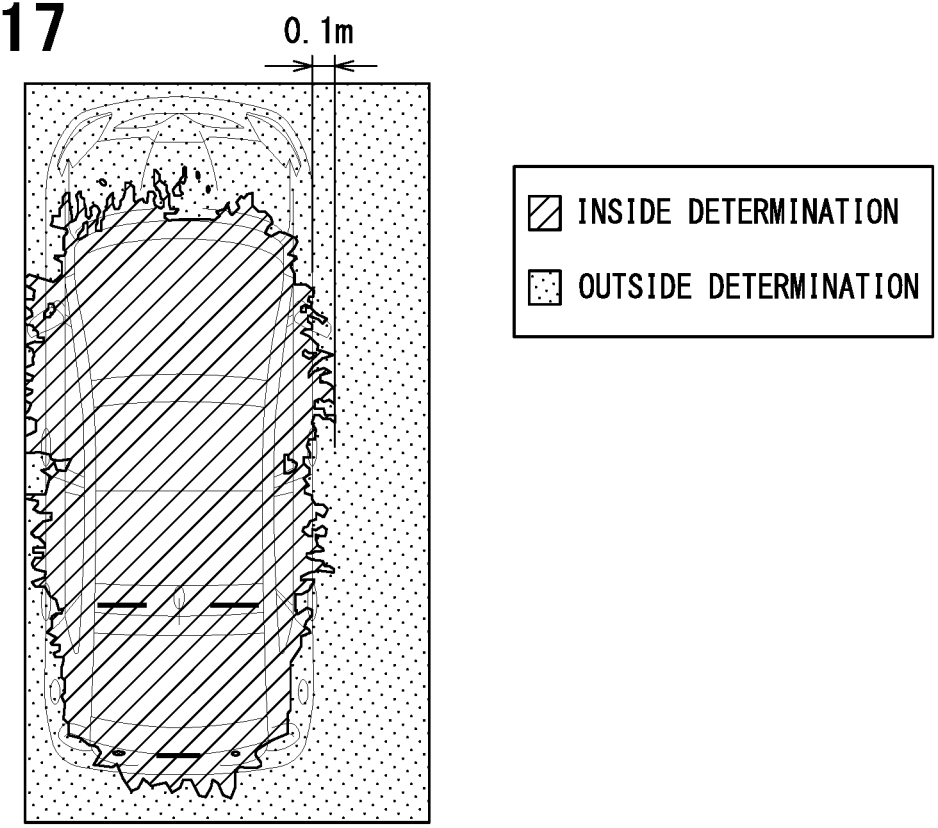
FIG. 17 is a diagram showing a test result of an operation executed by a configuration according to an embodiment of the present disclosure.

FIG. 17 is a diagram showing a test result of the operation according to the present embodiment in the empty state of the vehicle (that is, a determination result of the position of the mobile terminal 2). As is clear from a comparison of FIG. 17 with FIG. 15, according to the configuration of the present embodiment, an erroneous determination that the mobile terminal 2 is determined to be existing in the vehicle compartment even though the mobile terminal actually exists outside the vehicle compartment can be reduced compared with the first comparative configuration. Specifically, the area outside the vehicle compartment within which the mobile terminal is erroneously determined to be existing in the vehicle compartment can be reduced to within 10 cm (=0.1 m) from the window portion of the vehicle. This determination accuracy is equal to or higher than a determination accuracy of an electronic key system for vehicles which determines a position of a mobile terminal using radio wave of LF band. That is, according to the configuration of the present embodiment, the determination accuracy generally required in the technical field of the electronic key system for vehicles can be sufficiently satisfied.

In the full state of the vehicle, the calculated attenuation amount S has a relatively large value. Thus, a value close to a full capacity estimated value is set as the inside corresponding value Pin. In this configuration, since a relatively low value is set as the inside corresponding value Pin in the full state of the vehicle, the possibility of erroneous determination that the mobile terminal 2 is determined to be existing outside the vehicle compartment even though the mobile terminal 2 exists inside of the vehicle compartment can be reduced.

Figure 18:
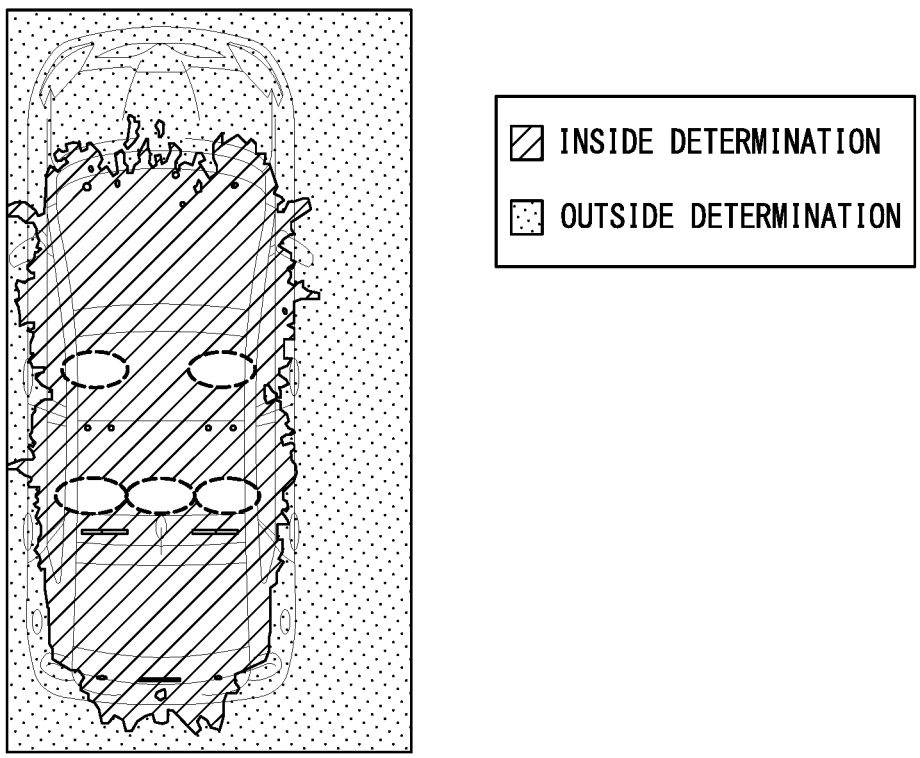
FIG. 18 is a diagram showing a test result of an operation executed by a configuration according to the embodiment of the present disclosure.

FIG. 18 is a diagram showing a test result of the operation according to the present embodiment in the full state of the vehicle (that is, a determination result of the position of the mobile terminal 2). As is clear from a comparison of FIG. 18 with FIG. 16, according to the configuration of the present embodiment, an erroneous determination that the mobile terminal 2 is determined to be existing outside the vehicle compartment even though the mobile terminal actually exists in the vehicle compartment can be reduced compared with the first comparative configuration. Specifically, the area in the vehicle compartment where the mobile terminal is erroneously determined to be existing outside the vehicle compartment can be reduced to 0%. The area surrounded by the ellipse of broken line in FIG. 16 and FIG. 18 indicates the area where the occupant exists.

In the present embodiment, as described above, the inside corresponding value Pin is changed according to the number of occupants. The attenuation amount S also reflects the amount of luggage brought into the vehicle compartment.

The attenuation amount S reflects the degree of influence of the radio wave absorbers existing in the vehicle compartment. The amount of radio wave absorbers include not only the number of occupants but also the amount of luggage or the like. Thus, by the configuration of the present embodiment, the inside corresponding value Pin can be set more appropriately. According to the configuration described above, the possibility of erroneously determining that the mobile terminal 2 is existing in the vehicle compartment caused by the number of occupants in the vehicle compartment and the amount of luggage brought into the vehicle compartment can be reduced even though the mobile terminal 2 is existing outside the vehicle compartment.

Estimation of the amount of the radio wave absorbers corresponds to estimation of the amount of absorbed radio waves (radio signals), which are transmitted from the mobile terminal 2, by an object existing in the vehicle compartment. According to another viewpoint, the absorber amount estimation unit F4 estimates the absorbed amount of radio waves (radio signals), which are transmitted from the mobile terminal 2, by an object existing in the vehicle compartment. The expression of estimation of the amount of radio wave absorbers also includes estimation of the amount of absorbed radio waves, which are transmitted from the mobile terminal 2, by an object existing in the vehicle compartment. The expression of estimation of the amount of radio wave absorbers also includes specifying of the number of occupants on board, specifying total weight and total volume (body size) of the occupants or the like, other than the estimation of the attenuation amount S. Details about these examples will be described later.

The case where the attenuation amount S is large corresponds to the case where the reception strength of the signal transmitted from the transmitter (that is, the inside device transmission signal) at each receiver is small. The attenuation amount S functions as an index of the amount of radio wave absorbers existing in the vehicle compartment. Similarly, the reception strength of the signal, which is transmitted from the transmitter and received at each receiver, functions as an index of the amount of radio wave absorbers existing in the vehicle compartment. The attenuation amount S increases with a decrease of the reception strength of the signal, which is transmitted from the transmitter and received at each receiver. As a result, the inside corresponding value Pin is set to a relatively small value corresponding to the increase of attenuation amount S. In the above configuration, the absorber amount estimation unit F4 acquires, as an index of the amount of the radio wave absorbers existing in the vehicle compartment, the reception strength of the inside device transmission signal, which is transmitted from the transmitter and received by the receiver in the vehicle compartment. Then, the threshold adjusting unit F5 sets the inside corresponding value to a relatively small value in response to the reception strength being relatively small.

The case where the attenuation amount S is large corresponds to the case where the reception strength of the signal transmitted from the transmitter (that is, the inside device transmission signal) at each receiver is small and the model differential value $\Delta P$ is large. The attenuation amount S functions as an index of the amount of radio wave absorbers existing in the vehicle compartment. Similarly, the model differential value $\Delta P$ related to each receiver functions as an index of the amount of radio wave absorbers existing in the vehicle compartment. The attenuation amount S increases with an increase of the model differential value $\Delta P$ related to each receiver. As a result, the inside corresponding value Pin is set to a relatively small value corresponding to the increase of attenuation amount S. In the above configuration, the absorber amount estimation unit F4 calculates, as an index of the amount of the radio wave absorbers existing in the vehicle compartment, the model differential value $\Delta P$ related to each receiver. Then, the threshold adjusting unit F5 sets the inside corresponding value to a relatively small value in response to the model differential value $\Delta P$ being relatively large.

In the above-described embodiment, multiple vehicle inside communication devices 13 are operated as receivers. However, the number of the receivers may be set to one. In this case, the model differential value $\Delta P$ determined based on the observed value Po of the receiver is adopted as the attenuation amount S. That is, when there is only one receiver, the model differential value $\Delta P$ itself corresponds to the attenuation amount S. Thus, the threshold adjusting unit F5 sets the inside corresponding value to a relatively small value in response to the model differential value $\Delta P$ being relatively large.

Members having a function identical to that of the members described in the above embodiment will be denoted by identical reference signs and will not be described repeatedly. When only a part of the configuration is described, the configuration described in the preceding embodiment can be applied to other parts.

(First Modification)

The authentication ECU 11 may be configured to dynamically change the vehicle inside communication device 13 which functions as the transmitter. For example, the absorber amount estimation unit F4 changes the on-board communication device 3 which functions as the transmitter in the order of the front communication device 13A, the trunk communication device 13B, the first rear communication device 13C, and the second rear communication device 13D. That is, the on-board communication device 3 which functions as the transmitter is shifted in predetermined order. This configuration corresponds to a configuration in which the transmitter is changed in alternative shift.

As shown in FIG. 19, for example, the strength model data of the communication devices in the present embodiment may indicate the estimation value of the reception strength in each receiver in a case where one of the multiple vehicle inside communication devices 13 is used as the transmitter and remaining vehicle inside communication devices 13 are used as the receivers. That is, the strength model data of the communication devices in this modification includes, in addition to the estimated values of the reception strengths of the remaining vehicle inside communication devices 13 when the front communication device 13A is set as the transmitter, the estimated values of the reception strengths of the remaining vehicle inside communication devices 13 when the trunk communication device 13B is set as the transmitter, the estimated values of the reception strengths of the remaining vehicle inside communication devices 13 when the first rear communication device 13C is set as the transmitter, or the like. The estimated value of the reception strengths of the vehicle inside communication devices 13 in each combination may be acquired by a test.

The absorber amount estimation unit F4 of the present embodiment may calculate the model differential value $\Delta P$ corresponding to all of the combinations in S204, and adopt the average value of the attenuation amounts S as the attenuation amount S. Such a configuration corresponds to evaluation of the degree of influence caused by the radio wave absorbers in various directions. Thus, the amount of the radio wave absorbers existing in the vehicle compartment can be evaluated more accurately. As a result, it is expected that the inside corresponding value Pin can be set more appropriately, and the accuracy of position determination of the mobile terminal 2 can be improved.

Each vehicle inside communication device 13 may be disposed so that the position of each vehicle inside communication device is out of the viewable ranges of remaining vehicle inside communication devices 13. This is because of the following reason. Suppose that the receiver is located within the viewable range of transmitter. In this configuration, the reception strength in the receiver may greatly fluctuate whether radio wave absorbers, such as occupant or luggage exist in the propagation path of the direct waves from the transmitter to the receiver. That is, the influence of the position of the radio wave absorber in the vehicle compartment on the attenuation amount S becomes large. The attenuation amount S may be directly used as data indicating the amount of the radio wave absorbers existing in the vehicle compartment. Thus, the influence caused by the position of the radio wave absorbers in the vehicle compartment on the attenuation amount S needs to be suppressed. When the receiver is located outside of the viewable range of the transmitter, the signal received by the receiver is a reflected wave (in other words, a multipath wave). Thus, the influence caused by the position of the radio wave absorber in the vehicle compartment can be reduced. That is, according to the configuration in which each vehicle inside communication device 13 is disposed so that the position of each vehicle inside communication device is out of the viewable ranges of remaining vehicle inside communication devices 13, it is possible to reduce the possibility that the attenuation amount S fluctuates according to the position of the radio wave absorber in the vehicle compartment. That is, the influence of the position of the radio wave absorber on the attenuation amount S can be reduced, and the accuracy of the attenuation amount S, which functions as an index indicating the amount of the radio wave absorber in the vehicle compartment, can be improved.

(Second Modification)

In the foregoing embodiments, the model differential value ΔP is calculated with the reception strength, which is obtained under the vehicle inside environment is set to the empty state, as the reference. However, the present disclosure is not limited to this configuration. The strength model data of the communication devices may indicate the estimated value of the reception strength when the vehicle is in full state. The strength model data of the communication devices used for calculating the attenuation amount S may be generated based on the reception strength observed under any vehicle compartment environment.

(Third Modification)

In the foregoing embodiments, the attenuation amount S is calculated using only the vehicle inside communication devices 13. However, the present disclosure is not limited to this configuration. When the data communication device 12 is positioned in the vehicle compartment, the data communication device 12 may be used in combination with the vehicle inside communication devices 13 to calculate the attenuation amount S.

(Fourth Modification)

In the foregoing embodiments, the inside corresponding value Pin is directly determined based on the attenuation amount S. However, the present disclosure is not limited to this configuration. The absorber amount estimation unit F4 may be configured to estimate the number of occupants based on the attenuation amount S. In this case, the threshold adjusting unit F5 may set the inside corresponding value Pin to a value corresponding to the number of occupants estimated by the absorber amount estimation unit F4. A correspondence relationship between the attenuation amount S and the number of occupants, and the inside corresponding value Pin corresponding to the number of occupants may be defined in advance by a mapping or the like. The inside corresponding value Pin may be configured to have a smaller value with an increase of the number of occupants in the vehicle compartment.

(Fifth Modification)

The absorber amount estimation unit F4 may be configured to acquire data indicating the seat positions of the driver's seat and the passenger seat from the body ECU 18, and properly use the strength model data of the communication devices to be used in the calculation of the attenuation amount S corresponding to the position of each seat. As a premise, it is assumed that the strength model data of the communication devices corresponding to each combination of previously set positions of the seats (in other words, a pattern) is registered in the flash memory 113 in advance.

(Sixth Modification)

In the foregoing embodiments, each of the data communication device 12, the vehicle inside communication device 13, and the vehicle outside communication device 14 is implemented by the on-board communication device 3 having the same configuration. However, the present disclosure is not limited to this configuration. The vehicle inside communication device 13 and the vehicle outside communication device 14 may be configured to without a transmission function (that is, receive signals only). In this configuration, the data communication device 12 operates as the transmitter, and the vehicle inside communication device 13 operates only as the receiver in the absorber amount estimation process.

(Seventh Modification)

In the foregoing embodiments, the vehicle inside communication device 13 is disposed in each area, such as the front area, the rear area, and the trunk area, which is divided by the vehicle compartment structure and may inhibit the propagation of radio waves. It is sufficient that two or more on-board communication devices 3 are existing in the vehicle compartment. As another embodiment, it is possible to adopt a configuration in which only the on-board communication device 3 that functions as the data communication device 12 and the front communication device 13A are provided in the vehicle compartment. Alternatively, only the on-board communication device 3 that functions as the data communication device 12 and the trunk communication device 13B may be provided in the vehicle compartment. Alternatively, only the on-board communication device 3 that functions as the data communication device 12, the front communication device 13A, and the trunk communication device 13B may be provided in the vehicle compartment. When the front communication device 13A functions as the data communication device 12, at least one of the trunk communication device 13B, the first rear communication device 13C, or the second rear communication device 13D is provided in the vehicle compartment in addition to the front communication device 13A.

(Eighth Modification)

Figure 20:
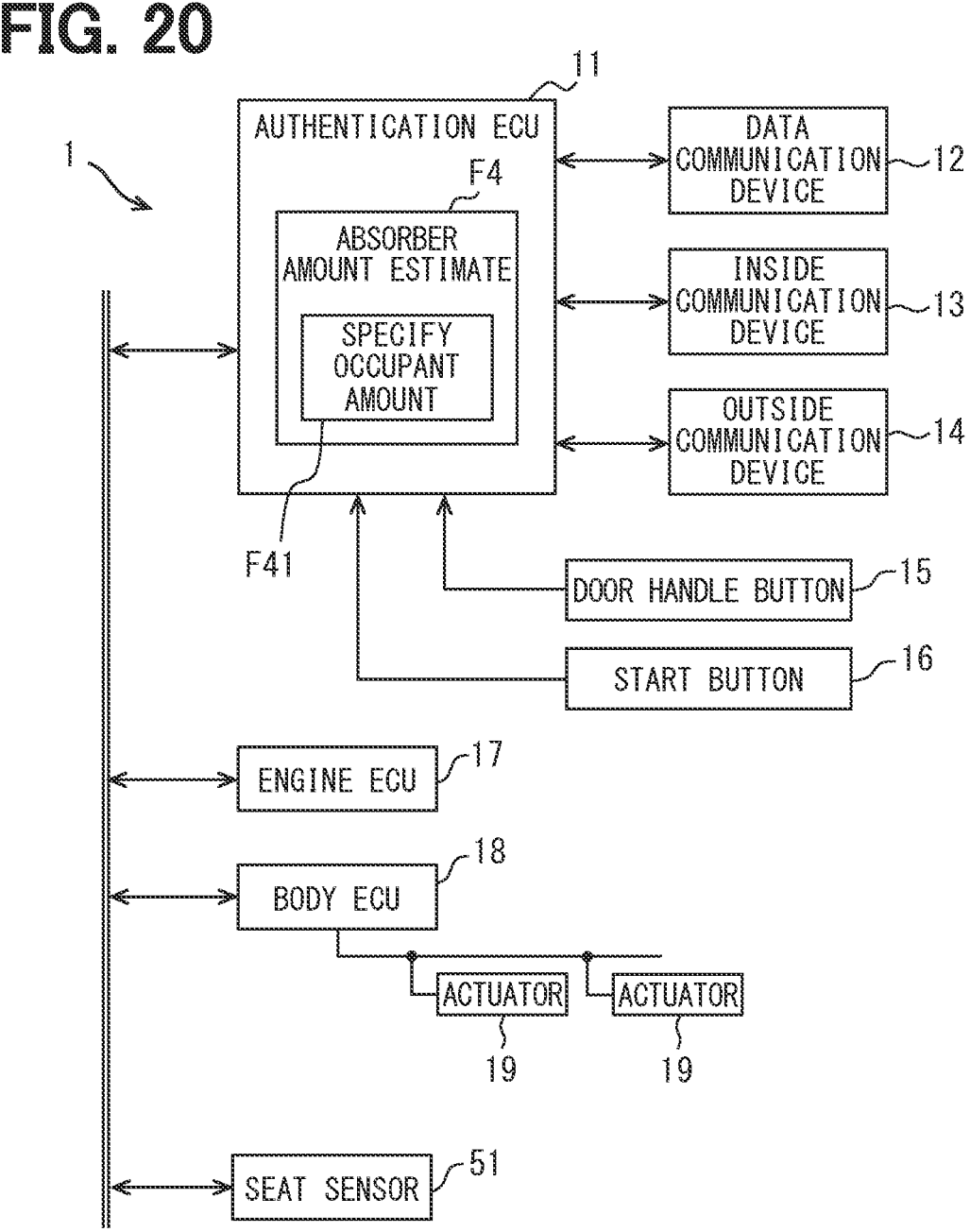
FIG. 20 is a block diagram showing a configuration of an on-board system according to an eighth modification of the present disclosure.

In the foregoing embodiments, the amount of the radio wave absorbers existing in the vehicle compartment is estimated based on the reception strength of the signal, which is transmitted from the transmitter and received at each receiver. The dynamic change of the inside corresponding value Pin is not limited to the above-described configuration. For example, when the on-board system 1 is equipped with a seat sensor 51 for each seat as shown in FIG. 20, the absorber amount estimation unit F4 may be configured to detect the number of occupants using the detection result of the seat sensors 51.

The seat sensor 51 is configured to detect whether an occupant is seated on the seat of the vehicle Hv (that is, in the seated state), and may be equipped to each seat of the vehicle Hv. The seat sensor is implemented by a pressure sensitive element, or the like. For convenience, the function of estimating the number of occupants by the absorber amount estimation unit F4 is referred to as an occupant amount specifying unit F41. The occupant amount specifying unit F41 may be provided as a sub-function of the absorber amount estimation unit F4, or may be provided as the absorber amount estimation unit F4 itself in the authentication ECU 11.

The amount of radio wave absorbers increases with an increase of the amount of occupants in the vehicle compartment. Thus, the threshold adjusting unit F5 in this modification decreases the value adopted as the inside corresponding value Pin to a smaller value with an increase of the amount of occupants. In this modification, the inside corresponding values Pin corresponding to different amount of occupants may be registered in advance in the flash memory 113, and the information may be used properly according to the actual number of occupants that is detected.

When the seat sensor 51 adopts a pressure sensitive film sensor and is able to detect the distribution of the load applied to the seat, the absorber amount estimation unit F4 may be configured to estimate, from the load distribution data output from each seat sensor 51, an occupant's weight, body size, volume, or the like. In this configuration, whether the occupant is an adult or a child can be determined from the body size of each occupant, and the amount of the radio wave absorbers can be evaluated more accurately. For example, the absorber amount estimation unit F4 may calculate the number of occupants under an assumption that a child corresponds to 0.7 adult. The absorber amount estimation unit F4 may calculate the total amount of the radio wave absorbers based on total sum of weights of the occupants seated on the seats. In this configuration, it can be considered that the amount of radio wave absorbers increases with an increase of the total sum of weights of the occupants.

In this modification, the occupant amount specifying unit F41 specifies the number of occupants based on the detection result of the seat sensor 51. However, the present disclosure is not limited to this configuration. As a sensor that outputs detection result indicating the number of occupants, a seatbelt sensor that detects a seatbelt wearing state can be adopted instead of the seat sensor 51. The occupant amount specifying unit F41 may be configured to specify the number of occupants based on the detection result of the seatbelt sensor. The occupant amount specifying unit F41 may determine the number of occupants by using an infrared sensor whose detection range is set within the vehicle compartment. For convenience, a device that outputs data indicating the occupant configuration, including the number of occupant, is referred to as an occupant information output device. The above-mentioned seat sensor 51, seatbelt sensor, infrared sensor, and the like correspond to the occupant information output device.

Figure 21:
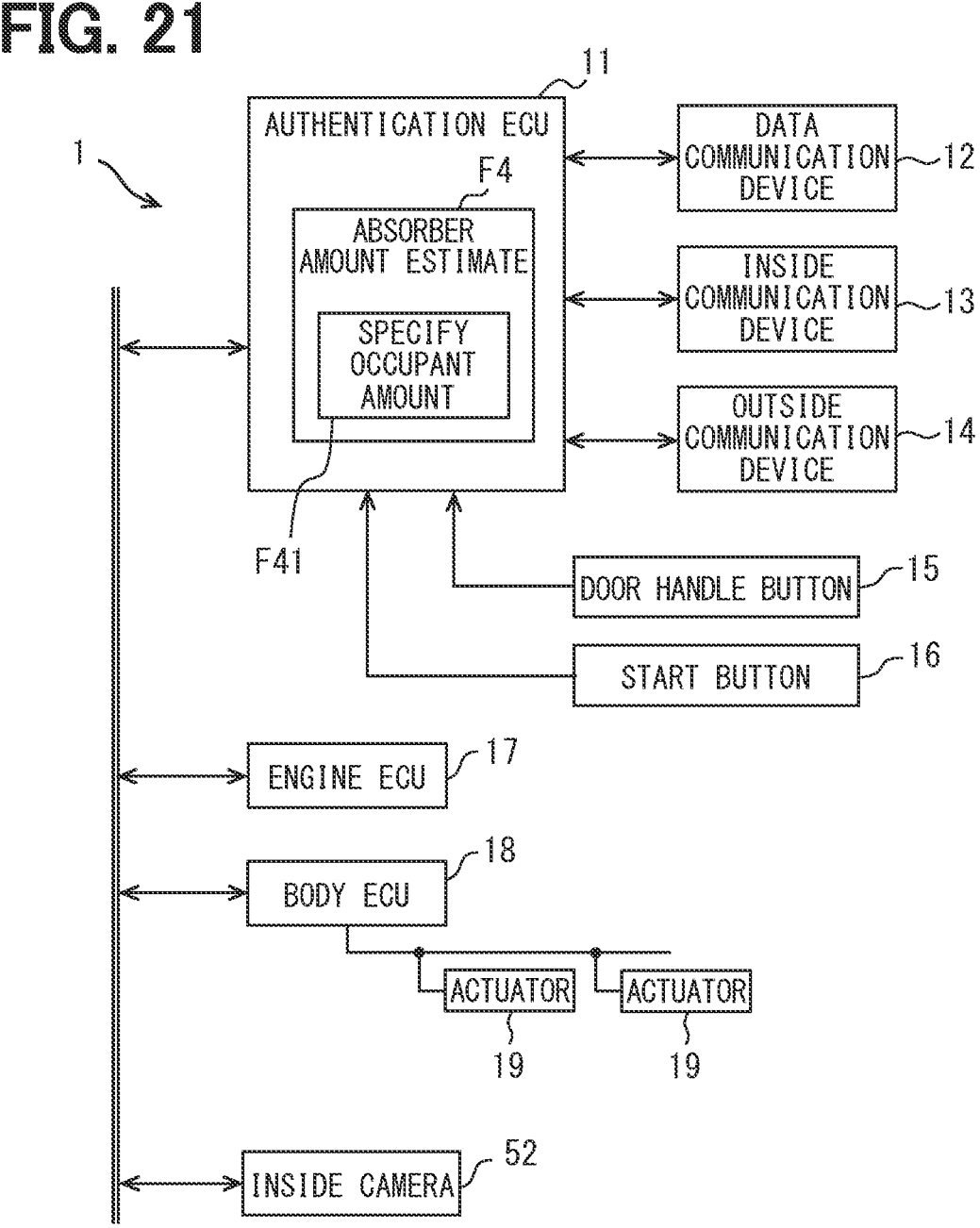
FIG. 21 is a block diagram showing another configuration of an on-board system according to the eighth modification of the present disclosure.

The on-board system 1 may include an on-board camera 52 as the occupant information output device. The on-board camera 52 is equipped in the vehicle compartment so as to photograph the entire inside area of the vehicle compartment as shown in FIG. 21. The occupant amount specifying unit F41 may specify the amount of occupants on board by analyzing the image captured by the on-board camera 52. When the absorber amount estimation unit F4 is configured to utilize the on-board camera 52 as the occupant information output device, the absorber amount estimation unit F4 may determine whether each occupant is an adult or a child and estimate the body size of each occupant by individually analyzing an image of each occupant. With this configuration, the absorber amount estimation unit F4 can calculate the amount of radio wave absorbers in a more appropriate manner. The absorber amount estimation unit F4 may be configured to use the data output from the various kinds of occupant information output devices described above in a complementarily combined manner. For example, the absorber amount estimation unit F4 may be configured to specify the number of occupants and the like by using the seat sensor 51 and the on-board camera 52 in combination.

Further, the absorber amount estimation unit F4 may be configured to estimate the absorber amount by combining the attenuation amount S described in the first embodiment with the data output from the various kinds of occupant information output devices. For example, an occupant amount specifying unit F541 may specify the number of occupants based on the data output from the occupant information output device, and the threshold adjusting unit F5 reads out the inside corresponding value Pin corresponding to the number of occupants from the flash memory 113 as a temporary threshold. The data indicating the inside corresponding values Pin corresponding to different numbers of occupants (hereinafter, referred to as occupant amount-threshold data) may be defined in advance by a test or the like and stored in the flash memory 113.

The threshold adjusting unit F5 adopts, as the final inside corresponding value Pin, a value obtained by adjusting the temporary threshold corresponding to the number of occupants based on the attenuation amount S. For example, when the number of occupants estimated based on the attenuation amount S is larger than the number of occupants specified from the data output from the occupant information output device, the threshold adjusting unit F5 sets, as the final inside corresponding value, the value obtained by decreasing the temporary threshold corresponding to the number of occupants by a predetermined amount. In the flash memory 113, data indicating the number of occupants estimated based on the attenuation amount S may be registered as attenuation amount-occupant number data. The number of occupants estimated based on the attenuation amount S may be larger than the number of occupants determined based on the data output from the occupant information output device. This is because, some occupants may be large in body size, or the occupant information output device, such as the seat sensor may erroneously detect the number of occupants. For example, when the number of occupants estimated based on the attenuation amount S is smaller than the number of occupants specified from the data output from the occupant information output device, the threshold adjusting unit F5 sets, as the final inside corresponding value, the value obtained by increasing the temporary threshold corresponding to the number of occupants by a predetermined amount. The number of occupants estimated based on the attenuation amount S may be smaller than the number of occupants determined based on the data output from the occupant information output device. This is because, the ratio of children among the total occupants may be high, or the occupant information output device, such as the seat sensor may erroneously detect the number of occupants. According to this configuration, the inside corresponding value Pin can be set more appropriately according to the occupant configuration. The adjusting amount of the temporary threshold corresponding to the attenuation amount S may be set to about 1 to 3 dB. The adjusting amount of the temporary threshold corresponding to the attenuation amount S may be set according to the level of difference between the number of occupants which is determined based on the data output from the occupant information output device and the number of occupants estimated based on the attenuation amount S. For example, when the number of occupants estimated based on the attenuation amount S is different from the number of occupants determined based on the data output from the occupant information output device by one occupant, the adjusting amount of the temporary threshold may be set to 1 dB. For example, when the number of occupants estimated based on the attenuation amount S is different from the number of occupants determined based on the data output from the occupant information output device by two occupants, the adjusting amount of the temporary threshold may be set to 2 dB. From another point of view, the larger the actually detected attenuation amount S than the attenuation amount S which is estimated based on the number of occupants determined based on the data output from the occupant information output device, the smaller the inside corresponding value Pin.

(Ninth Modification)

The absorber amount estimation unit F4 may be configured to estimate the seating position of the occupant in the vehicle compartment based on the data (for example, the detection result) output from the occupant information output device, such as the seat sensor 51. When the absorber amount estimation unit F4 is configured to be able to estimate the seating position, the position determination unit F6 may determine the inside device strength representative value Pa by assigning a correction amount to the individual strength representative value of each vehicle inside communication device 13. The correction amount may be determined based on the installation position of each vehicle inside communication device 13 and the seating position of the occupant determined by the absorber amount estimation unit F4.

For example, when an occupant is sitting on the right rear seat, the signal from the mobile terminal 2 is absorbed by the person. Thus, the reception strength of the first rear communication device 13C may be reduced. When a person is sitting in the right rear seat, the value obtained by adding several dBm (for example, 2 dBm) to the individual strength representative value calculated based on the actual reception strength of the first rear communication device 13C is used as the individual strength representative value for determining the inside device strength representative value. As the individual strength representative value of each vehicle inside communication device 13, the individual strength representative value calculated based on the actual reception strength may be corrected by the correction value corresponding to the seating position, and then the inside device strength representative value may be determined based on the corrected individual strength representative value.

Whether to correct the individual strength representative value of the vehicle inside communication device 13 may be determined by whether an occupant is seated in the seat near the vehicle inside communication device 13. The correction amount of the individual strength representative value of each vehicle inside communication device 13 may be determined depending on whether an occupant is seated in the seat associated with the vehicle inside communication device 13. The correction amount of individual strength representative value may be registered in the flash memory 113 in advance. The correction amount may be changed according to the body size of the occupant. The larger the body size of the seated occupant, the larger the correction amount.

(Tenth Modification)

In the foregoing embodiments, two vehicle outside communication devices 14 are disposed on right surface of the vehicle Hv, and two vehicle outside communication devices 14 are disposed on the left surface of the vehicle Hv. However, the present disclosure is not limited to this configuration. As another example, only one vehicle outside communication device 14 may be disposed on each of the right surface and the left surface of the vehicle Hv.

Figure 22:
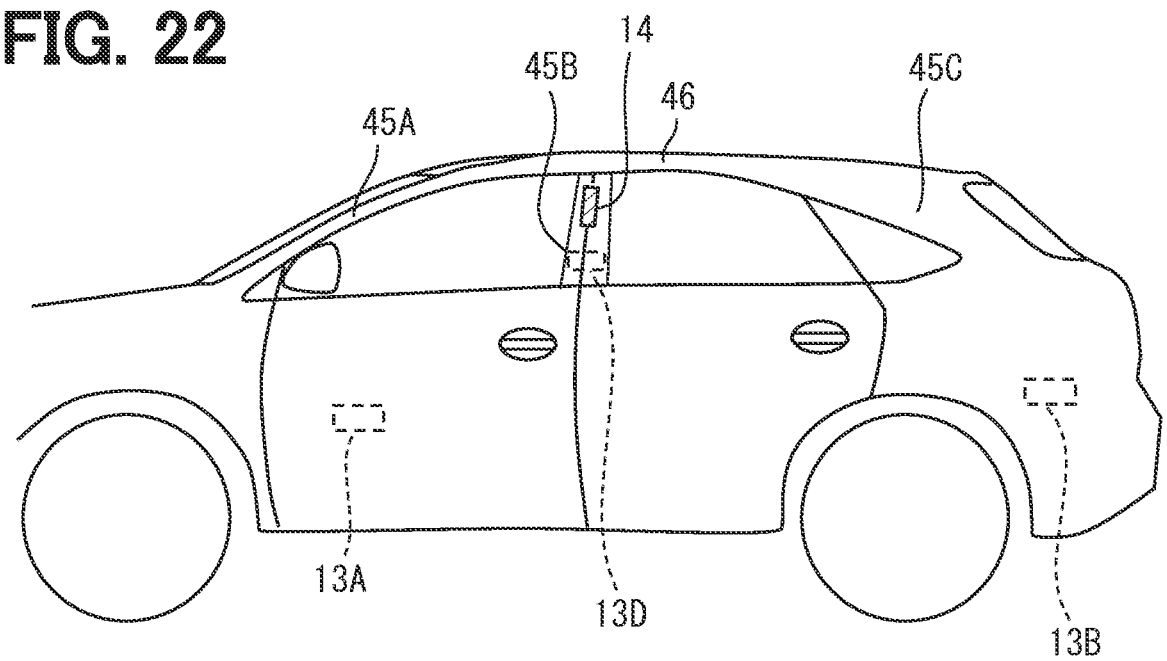
FIG. 22 is a diagram showing a modification of a mounting position of a vehicle outside communication device.

As shown in FIG. 22, the vehicle outside communication device 14 may be equipped to the B pillar 45B of the vehicle Hv. Alternatively, the vehicle outside communication device 14 may be equipped to the A pillar 45A or to the C pillar 45C. The vehicle outside communication device 14 may be disposed close to a boundary 46 between the lateral surface of the vehicle Hv and the roof portion of the vehicle (hereinafter, also referred to as an upper end portion of the lateral surface). The configuration described above corresponds to a configuration in which the vehicle outside communication device 14 is disposed at a portion above the window. The upper end portion 46 of the lateral surface corresponds a part of the roof portion of the vehicle Hv which contacts with the upper end of the door of the vehicle Hv.

The pillars and the lateral upper end 46 correspond to a window vicinity region on the outer surface of the vehicle Hv. A portion within one wavelength from a lower end of the window may also be included in the window vicinity region. That is, the window vicinity region in the present embodiment is directed to an outer surface of the vehicle positioned within one wavelength from the window frame. The vehicle outside communication devices 14 may be disposed so that the outer portion of the window is set to the strong electric field area. As parameters configuring the installation position of the vehicle outside communication device 14, a mounting position, a mounting posture (in other words, directivity) and the like can be adopted.

(Eleventh Modification)

In the foregoing embodiments, the position determination system for vehicle according to the present disclosure is applied to the vehicle Hv having the metal body. However, the vehicle suitable as an application target of the position determination system for vehicle is not limited to the vehicle having the metal body.

For example, the various body panels configuring the body of the vehicle Hv may be made of a carbon-based resin which is filled with a sufficient amount of carbon to attenuate the propagation of radio waves by 5 dB or more. A vehicle having the body described above is also suitable as an application target of the position determination system for vehicle.

The body panels of the vehicle Hv may be made of a general-purpose resin which contains no carbon. In the case where the body panels of the vehicle Hv is made of a general-purpose resin which contains no carbon, a specific metal pattern having a function of blocking the propagation of radio waves may be provided on the surface of the body panels. The metal pattern (hereinafter, referred to as a shield pattern) which has a function of blocking the propagation of the radio waves is a pattern in which fine wire conductors such as silver nanowires are arranged in a lattice pattern at intervals of 12 wavelengths or less of radio waves, for example. In this example, the thin line indicates a line width of 50 μm or less.

The shield pattern can be implemented with the use of a well-known meta surface structure. The meta surface structure is a structure in which artificial structures called unit cells (Unit Cell) are repeatedly arranged. According to the meta surface structure, only radio waves (in this example, radio waves) in a specific frequency band can be selectively reflected or attenuated (that is, blocked). The body of the vehicle Hv may be configured to block the propagation of the radio waves by coating a paint containing metal powder or carbon powder on the body made of the general-purpose resin. Further, a film for blocking the propagation of the radio waves (hereinafter, referred to as a shield film) may be attached to the body. A vehicle having the body described above is also suitable as an application target of the position determination system for vehicle. Partial or entire part of the body of the vehicle Hv may be made of the general-purpose resin.

The units or functions provided by the authentication ECU 11 may be provided by software stored in a tangible memory device and a computer executing the software, only software, only hardware, or a combination of the software and the hardware. For example, when the authentication ECU 11 is provided by an electronic circuit implemented as hardware, the electronic circuit may be provided by a digital circuit including multiple logic circuits or analog circuits. The authentication ECU 11 may also be provided by a single computer, or a set of computer resources linked by a data communication device.

It is noted that a flowchart or the process of the flowchart in the present disclosure includes multiple steps (also referred to as sections), each of which is represented, for example, as S101. Further, each step can be divided into several sub-steps while several steps can be combined into a single step.

In the above, the embodiment, the configuration, and the example of the position determination system according to the present disclosure are described. However, the present disclosure is not limited to every embodiment, every configuration and every example related to the present disclosure described above. For example, embodiments, configurations, and examples obtained from an appropriate combination of technical elements disclosed in different embodiments, configurations, and examples are also included within the scope of the embodiments, configurations, and examples of the present disclosure.

The invention claimed is:

1. A position determination system, which is applied to a vehicle and determines a position of a mobile terminal carried by a user of the vehicle relative to the vehicle by performing a wireless communication with the mobile terminal, the position determination system comprising:

at least one vehicle inside communication device positioned in a vehicle compartment of the vehicle and configured to:
  receive a wireless signal transmitted from the mobile terminal; and
  detect a reception strength of the wireless signal that is received as an inside device strength;
a position determination unit configured to determine whether the mobile terminal is existing in the vehicle compartment based on the inside device strength;
an absorber amount estimation unit configured to estimate an amount of radio wave absorbers, which exist in the vehicle compartment and absorb radio waves each having a frequency band used in the wireless communication, the amount of radio wave absorbers being estimated based on at least one of a reception state of the wireless signal in the at least one vehicle communication device or a detection result of a sensor equipped to the vehicle; and
a threshold adjusting unit configured to adjust, based on an estimation result of the absorber amount estimation unit, an inside determination value which is a threshold referred by the position determination unit to determine that the mobile terminal is existing in the vehicle compartment, wherein the position determination unit determines that the mobile terminal is existing in the vehicle compartment in response to the inside device strength being equal to or greater than the inside determination value adjusted by the threshold adjusting unit, the at least one vehicle inside communication device includes a plurality of vehicle inside communication devices, one of the plurality of vehicle inside communication devices is configured to operate as a transmitter which transmits the wireless signal including transmission source information, at least one of the remaining of the plurality of vehicle inside communication devices is configured to operate as a receiver, the receiver is configured to:
  receive, as an inside device transmission signal, the wireless signal transmitted from the transmitter;
  detect a reception strength of the inside device transmission signal; and
  report the detected reception strength of the inside device transmission signal to the absorber amount estimation unit, the absorber amount estimation unit acquires, as an index indicating the amount of radio wave absorbers existing in the vehicle compartment, the reception strength of the inside device transmission signal which is detected by the receiver, the threshold adjusting unit sets the inside determination value in a manner that the inside determination value decreases with a decrease of the reception strength of the inside device transmission signal acquired by the absorber amount estimation unit, the position determination system further includes a strength model storage configured to store, as an estimated strength value, an estimated value of the reception strength of the inside device transmission signal, which is transmitted from the transmitter and received by the receiver, under a condition that an environment inside the vehicle compartment becomes a predetermined model environment, the absorber amount estimation unit calculates, as the index indicating the amount of radio wave absorbers existing in the vehicle compartment, a model differential value by subtracting the reception strength of the inside device transmission signal which is detected by the receiver from the estimated strength value stored in the strength model storage, the threshold adjusting unit sets the inside determination value in a manner that the inside determination value decreases with an increase of the model differential value calculated by the absorber amount estimation unit, the transmitter is configured to transmit the wireless signal as the inside device transmission signal using a plurality of frequencies, the receiver is configured to detect the reception strength of the inside device transmission signal for each of the plurality of frequencies, and the absorber amount estimation unit is configured to:
calculate, for each receiver, the individual strength representative value corresponding to each receiver, which represents the reception strength of the inside device transmission signal in each receiver, based on the reception strength corresponding to each of the plurality of frequencies detected by the corresponding receiver; and calculate, as the model differential value, a difference between the individual strength representative value corresponding to each receiver and the estimated strength value for each receiver.

2. A position determination system, which is applied to a vehicle and determines a position of a mobile terminal carried by a user of the vehicle relative to the vehicle by performing a wireless communication with the mobile terminal, the position determination system comprising:

at least one vehicle inside communication device positioned in a vehicle compartment of the vehicle and configured to:
receive a wireless signal transmitted from the mobile terminal; and
detect a reception strength of the wireless signal that is received as an inside device strength;

a position determination unit configured to determine whether the mobile terminal is existing in the vehicle compartment based on the inside device strength;

an absorber amount estimation unit configured to estimate an amount of radio wave absorbers, which exist in the vehicle compartment and absorb radio waves each having a frequency band used in the wireless communication, the amount of radio wave absorbers being estimated based on at least one of a reception state of the wireless signal in the at least one vehicle communication device or a detection result of a sensor equipped to the vehicle; and a threshold adjusting unit configured to adjust, based on an estimation result of the absorber amount estimation unit, an inside determination value which is a threshold referred by the position determination unit to determine that the mobile terminal is existing in the vehicle compartment, wherein the position determination unit determines that the mobile terminal is existing in the vehicle compartment in response to the inside device strength being equal to or greater than the inside determination value adjusted by the threshold adjusting unit, the at least one vehicle inside communication device includes a plurality of vehicle inside communication devices, one of the plurality of vehicle inside communication devices is configured to operate as a transmitter which transmits the wireless signal including transmission source information, at least one of the remaining of the plurality of vehicle inside communication devices is configured to operate as a receiver, the receiver is configured to:
receive, as an inside device transmission signal, the wireless signal transmitted from the transmitter;
detect a reception strength of the inside device transmission signal; and
report the detected reception strength of the inside device transmission signal to the absorber amount estimation unit, the absorber amount estimation unit acquires, as an index indicating the amount of radio wave absorbers existing in the vehicle compartment, the reception strength of the inside device transmission signal which is detected by the receiver, the threshold adjusting unit sets the inside determination value in a manner that the inside determination value decreases with a decrease of the reception strength of the inside device transmission signal acquired by the absorber amount estimation unit, and the plurality of vehicle inside communication devices are disposed in the vehicle compartment in a manner that each vehicle inside communication device is out of a viewable range of each of the remaining of the plurality of vehicle inside communication devices.

3. The position determination system according to claim 2, further comprising a strength model storage configured to store, as an estimated strength value, an estimated value of the reception strength of the inside device transmission signal, which is transmitted from the transmitter and received by the receiver, under a condition that an environment inside the vehicle compartment becomes a predetermined model environment, wherein the absorber amount estimation unit calculates, as the index indicating the amount of radio wave absorbers existing in the vehicle compartment, a model differential value by subtracting the reception strength of the inside device transmission signal which is detected by the receiver from the estimated strength value stored in the strength model storage, and the threshold adjusting unit sets the inside determination value in a manner that the inside determination value decreases with an increase of the model differential value calculated by the absorber amount estimation unit.

4. The position determination system according to claim 3, wherein the transmitter is configured to transmit the wireless signal as the inside device transmission signal using a plurality of frequencies, the receiver is configured to detect the reception strength of the inside device transmission signal for each of the plurality of frequencies, and the absorber amount estimation unit is configured to:
calculate, for each receiver, the individual strength representative value corresponding to each receiver, which represents the reception strength of the inside device transmission signal in each receiver, based on the reception strength corresponding to each of the plurality of frequencies detected by the corresponding receiver; and calculate, as the model differential value, a difference between the individual strength representative value corresponding to each receiver and the estimated strength value for each receiver.

5. The position determination system according to claim 3, wherein the at least one vehicle inside communication device includes three or more vehicle inside communication devices, one of the three or more vehicle inside communication devices is configured to operate as the transmitter and at least two of the remaining of the three or more vehicle inside communication devices are configured to operate as the receivers, the strength model storage is configured to store the estimated strength value corresponding to each combination in which the transmitter is paired with each receiver, the absorber amount estimation unit is configured to:
calculate the model differential value for each receiver based on the reception strength of the inside device transmission signal provided by the corresponding receiver; and
calculate an attenuation amount, which indicates an amount of the radio waves absorbed by the radio wave absorbers existing in the vehicle compartment, with the model differential value as a population for each receiver, and the threshold adjusting unit sets the inside determination value in a manner that the inside determination value decreases with an increase of the attenuation amount.

6. The position determination system according to claim 3, wherein
the transmitter is configured to successively transmit the wireless signal as the inside device transmission signal,
the receiver reports the reception strength of the inside device transmission signal to the absorber amount estimation unit in response to each reception of the inside device transmission signal, and
the absorber amount estimation unit is configured to:
calculate, based on the reception strength of the inside device transmission signal which is successively reported by each receiver, an individual strength representative value corresponding to each receiver, which represents the reception strength of the inside device transmission signal in each receiver, within a predetermined latest time period; and
calculate, as the model differential value, a difference between the individual strength representative value corresponding to each receiver and the estimated strength value for each receiver.

7. The position determination system according to claim 3, wherein
the absorber amount estimation unit estimates, as the index indicating the amount of radio wave absorbers existing in the vehicle compartment, an amount of occupants existing in the vehicle compartment based on the model differential value,
the model differential value is a difference between the reception strength of the inside device transmission signal detected by each receiver and the estimated strength value stored in the strength model storage, and
the threshold adjusting unit sets the inside determination value in a manner that the inside determination value decreases with an increase of the amount of the occupants estimated by the absorber amount estimation unit.

8. The position determination system according to claim 2, wherein
the absorber amount estimation unit adopts, as the sensor, at least one of a seat sensor configured to detect a seating state of an occupant on a seat, a seatbelt sensor configured to detect a wearing state of a seatbelt, or an on-board camera disposed in the vehicle compartment to capture an image of an entire inside area of the vehicle compartment, the absorber amount estimation unit specifies, based on the detection result of the sensor, the amount of occupants existing in the vehicle compartment as the index indicating the amount of radio wave absorbers existing in the vehicle compartment, and the threshold adjusting unit sets the inside determination value in a manner that the inside determination value decreases with an increase of the amount of the occupants specified by the absorber amount estimation unit.

9. The position determination system according to claim 8, wherein
the at least one vehicle inside communication device includes a plurality of vehicle inside communication devices,
each of the plurality of vehicle inside communication devices is disposed in the vehicle compartment at a position different from one another,
the absorber amount estimation unit specifies a seating position of each occupant in the vehicle compartment based on at least one of a detection result of the seat sensor, a detection result of the seatbelt sensor, or an image captured by the on-board camera disposed in the vehicle compartment, and
the position determination unit is configured to:
calculate, for the inside device strength acquired in each of the plurality of vehicle inside communication devices, an inside device strength representative value, which is a representative value of the reception strength of the wireless signal transmitted from the mobile terminal in the vehicle compartment, with use of a value to which a correction amount corresponding to the seating position specified by the absorber amount estimation unit and a position of each of the plurality of vehicle inside communication devices in the vehicle compartment is assigned; and
determine the position of the mobile terminal with use of the inside device strength representative value instead of the inside device strength.

10. A position determination system, which is applied to a vehicle and determines a position of a mobile terminal carried by a user of the vehicle relative to the vehicle by performing a wireless communication with the mobile terminal, the position determination system comprising:
at least one vehicle inside communication device positioned in a vehicle compartment of the vehicle and configured to:
receive a wireless signal transmitted from the mobile terminal; and
detect a reception strength of the wireless signal that is received as an inside device strength;
a position determination unit configured to determine whether the mobile terminal is existing in the vehicle compartment based on the inside device strength;
an absorber amount estimation unit configured to estimate an amount of radio wave absorbers, which exist in the vehicle compartment and absorb radio waves each having a frequency band used in the wireless communication, the amount of radio wave absorbers being estimated based on at least one of a reception state of the wireless signal in the at least one vehicle communication device or a detection result of a sensor equipped to the vehicle; and
a threshold adjusting unit configured to adjust, based on an estimation result of the absorber amount estimation unit, an inside determination value which is a threshold referred by the position determination unit to determine that the mobile terminal is existing in the vehicle compartment,
wherein
the position determination unit determines that the mobile terminal is existing in the vehicle compartment in response to the inside device strength being equal to or greater than the inside determination value adjusted by the threshold adjusting unit,
the absorber amount estimation unit adopts, as the sensor, at least one of a seat sensor configured to detect a seating state of an occupant on a seat, a seatbelt sensor configured to detect a wearing state of a seatbelt, or an on-board camera disposed in the vehicle compartment to capture an image of an entire inside area of the vehicle compartment,
the absorber amount estimation unit specifies, based on the detection result of the sensor, the amount of occupants existing in the vehicle compartment as the index indicating the amount of radio wave absorbers existing in the vehicle compartment,
the threshold adjusting unit sets the inside determination value in a manner that the inside determination value decreases with an increase of the amount of the occupants specified by the absorber amount estimation unit,
the at least one vehicle inside communication device includes a plurality of vehicle inside communication devices,
each of the plurality of vehicle inside communication devices is disposed in the vehicle compartment at a position different from one another,
the absorber amount estimation unit specifies a seating position of each occupant in the vehicle compartment based on at least one of a detection result of the seat sensor, a detection result of the seatbelt sensor, or an image captured by the on-board camera disposed in the vehicle compartment, and
the position determination unit is configured to:
  calculate, for the inside device strength acquired in each of the plurality of vehicle inside communication devices, an inside device strength representative value, which is a representative value of the reception strength of the wireless signal transmitted from the mobile terminal in the vehicle compartment, with use of a value to which a correction amount corresponding to the seating position specified by the absorber amount estimation unit and a position of each of the plurality of vehicle inside communication devices in the vehicle compartment is assigned; and
  determine the position of the mobile terminal with use of the inside device strength representative value instead of the inside device strength.

11. The position determination system according to claim 10, wherein
the at least one vehicle inside communication device includes a plurality of vehicle inside communication devices,
one of the plurality of vehicle inside communication devices is configured to operate as a transmitter which transmits the wireless signal including transmission source information,
at least one of the remaining of the plurality of vehicle inside communication devices is configured to operate as a receiver,
the receiver is configured to:
  receive, as an inside device transmission signal, the wireless signal transmitted from the transmitter;
  detect a reception strength of the inside device transmission signal; and
  report the detected reception strength of the inside device transmission signal to the absorber amount estimation unit,
the absorber amount estimation unit acquires, as an index indicating the amount of radio wave absorbers existing in the vehicle compartment, the reception strength of the inside device transmission signal which is detected by the receiver, and
the threshold adjusting unit sets the inside determination value in a manner that the inside determination value decreases with a decrease of the reception strength of the inside device transmission signal acquired by the absorber amount estimation unit.

12. The position determination system according to claim 11, further comprising
a strength model storage configured to store, as an estimated strength value, an estimated value of the reception strength of the inside device transmission signal, which is transmitted from the transmitter and received by the receiver, under a condition that an environment inside the vehicle compartment becomes a predetermined model environment,
wherein
the absorber amount estimation unit calculates, as the index indicating the amount of radio wave absorbers existing in the vehicle compartment, a model differential value by subtracting the reception strength of the inside device transmission signal which is detected by the receiver from the estimated strength value stored in the strength model storage, and
the threshold adjusting unit sets the inside determination value in a manner that the inside determination value decreases with an increase of the model differential value calculated by the absorber amount estimation unit.

13. The position determination system according to claim 12, wherein
the at least one vehicle inside communication device includes three or more vehicle inside communication devices,
one of the three or more vehicle inside communication devices is configured to operate as the transmitter and at least two of the remaining of the three or more vehicle inside communication devices are configured to operate as the receivers,
the strength model storage is configured to store the estimated strength value corresponding to each combination in which the transmitter is paired with each receiver,
the absorber amount estimation unit is configured to:
  calculate the model differential value for each receiver based on the reception strength of the inside device transmission signal provided by the corresponding receiver; and
  calculate an attenuation amount, which indicates an amount of the radio waves absorbed by the radio wave absorbers existing in the vehicle compartment, with the model differential value as a population for each receiver, and
the threshold adjusting unit sets the inside determination value in a manner that the inside determination value decreases with an increase of the attenuation amount.

14. The position determination system according to claim 12, wherein the transmitter is configured to successively transmit the wireless signal as the inside device transmission signal, the receiver reports the reception strength of the inside device transmission signal to the absorber amount estimation unit in response to each reception of the inside device transmission signal, and the absorber amount estimation unit is configured to:
calculate, based on the reception strength of the inside device transmission signal which is successively reported by each receiver, an individual strength representative value corresponding to each receiver, which represents the reception strength of the inside device transmission signal in each receiver, within a predetermined latest time period; and calculate, as the model differential value, a difference between the individual strength representative value corresponding to each receiver and the estimated strength value for each receiver.

15. The position determination system according to claim 12, wherein the absorber amount estimation unit estimates, as the index indicating the amount of radio wave absorbers existing in the vehicle compartment, an amount of occupants existing in the vehicle compartment based on the model differential value, the model differential value is a difference between the reception strength of the inside device transmission signal detected by each receiver and the estimated strength value stored in the strength model storage, and the threshold adjusting unit sets the inside determination value in a manner that the inside determination value decreases with an increase of the amount of the occupants estimated by the absorber amount estimation unit.

16. The position determination system according to claim 1, further comprising:

a vehicle outside communication device disposed on an outer surface of the vehicle, wherein the vehicle outside communication device is configured to receive the wireless signal transmitted from the mobile terminal and detect a reception strength of the wireless signal that is received, the position determination unit determines that the mobile terminal is existing in the vehicle compartment in response to the inside device strength being equal to or greater than the inside determination value and an outside device strength being less than an outside corresponding value, the outside device strength indicates a reception strength of the wireless signal, which is transmitted from the mobile terminal and received by the vehicle outside communication device, and the outside device strength is detected by the vehicle outside communication device, and the outside corresponding value is a value used to determine that the mobile terminal is existing outside of the vehicle compartment.

17. The position determination system according to claim 2, further comprising:

a vehicle outside communication device disposed on an outer surface of the vehicle, wherein the vehicle outside communication device is configured to receive the wireless signal transmitted from the mobile terminal and detect a reception strength of the wireless signal that is received, the position determination unit determines that the mobile terminal is existing in the vehicle compartment in response to the inside device strength being equal to or greater than the inside determination value and an outside device strength being less than an outside corresponding value, the outside device strength indicates a reception strength of the wireless signal, which is transmitted from the mobile terminal and received by the vehicle outside communication device, and the outside device strength is detected by the vehicle outside communication device, and the outside corresponding value is a value used to determine that the mobile terminal is existing outside of the vehicle compartment.

18. The position determination system according to claim 10, further comprising:

a vehicle outside communication device disposed on an outer surface of the vehicle, wherein the vehicle outside communication device is configured to receive the wireless signal transmitted from the mobile terminal and detect a reception strength of the wireless signal that is received, the position determination unit determines that the mobile terminal is existing in the vehicle compartment in response to the inside device strength being equal to or greater than the inside determination value and an outside device strength being less than an outside corresponding value, the outside device strength indicates a reception strength of the wireless signal, which is transmitted from the mobile terminal and received by the vehicle outside communication device, and the outside device strength is detected by the vehicle outside communication device, and the outside corresponding value is a value used to determine that the mobile terminal is existing outside of the vehicle compartment.

19. The position determination system according to claim 1, wherein the at least one vehicle inside communication device includes three or more vehicle inside communication devices, one of the three or more vehicle inside communication devices is configured to operate as the transmitter and at least two of the remaining of the three or more vehicle inside communication devices are configured to operate as the receivers, the strength model storage is configured to store the estimated strength value corresponding to each combination in which the transmitter is paired with each receiver, the absorber amount estimation unit is configured to:
calculate the model differential value for each receiver based on the reception strength of the inside device transmission signal provided by the corresponding receiver; and calculate an attenuation amount, which indicates an amount of the radio waves absorbed by the radio wave absorbers existing in the vehicle compartment, with the model differential value as a population for each receiver, and the threshold adjusting unit sets the inside determination value in a manner that the inside determination value decreases with an increase of the attenuation amount.

20. The position determination system according to claim 1, wherein
- the transmitter is configured to successively transmit the wireless signal as the inside device transmission signal,
- the receiver reports the reception strength of the inside device transmission signal to the absorber amount estimation unit in response to each reception of the inside device transmission signal, and
- the absorber amount estimation unit is configured to:
  - calculate, based on the reception strength of the inside device transmission signal which is successively reported by each receiver, an individual strength representative value corresponding to each receiver, which represents the reception strength of the inside device transmission signal in each receiver, within a predetermined latest time period; and
  - calculate, as the model differential value, a difference between the individual strength representative value corresponding to each receiver and the estimated strength value for each receiver.

21. The position determination system according to claim 1, wherein
- the absorber amount estimation unit estimates, as the index indicating the amount of radio wave absorbers existing in the vehicle compartment, an amount of occupants existing in the vehicle compartment based on the model differential value,
- the model differential value is a difference between the reception strength of the inside device transmission signal detected by each receiver and the estimated strength value stored in the strength model storage, and
- the threshold adjusting unit sets the inside determination value in a manner that the inside determination value decreases with an increase of the amount of the occupants estimated by the absorber amount estimation unit.

22. The position determination system according to claim 1, wherein
- the absorber amount estimation unit adopts, as the sensor, at least one of a seat sensor configured to detect a seating state of an occupant on a seat, a seatbelt sensor configured to detect a wearing state of a seatbelt, or an on-board camera disposed in the vehicle compartment to capture an image of an entire inside area of the vehicle compartment,
- the absorber amount estimation unit specifies, based on the detection result of the sensor, the amount of occupants existing in the vehicle compartment as the index indicating the amount of radio wave absorbers existing in the vehicle compartment, and
- the threshold adjusting unit sets the inside determination value in a manner that the inside determination value decreases with an increase of the amount of the occupants specified by the absorber amount estimation unit.

23. The position determination system according to claim 22, wherein
- the at least one vehicle inside communication device includes a plurality of vehicle inside communication devices,
- each of the plurality of vehicle inside communication devices is disposed in the vehicle compartment at a position different from one another,
- the absorber amount estimation unit specifies a seating position of each occupant in the vehicle compartment based on at least one of a detection result of the seat sensor, a detection result of the seatbelt sensor, or an image captured by the on-board camera disposed in the vehicle compartment, and
- the position determination unit is configured to:
  - calculate, for the inside device strength acquired in each of the plurality of vehicle inside communication devices, an inside device strength representative value, which is a representative value of the reception strength of the wireless signal transmitted from the mobile terminal in the vehicle compartment, with use of a value to which a correction amount corresponding to the seating position specified by the absorber amount estimation unit and a position of each of the plurality of vehicle inside communication devices in the vehicle compartment is assigned; and
  - determine the position of the mobile terminal with use of the inside device strength representative value instead of the inside device strength.

* * * * *